US012512948B2

(12) United States Patent
Khoshnevisan et al.

(10) Patent No.: US 12,512,948 B2
(45) Date of Patent: Dec. 30, 2025

(54) IDENTIFICATION OF CONTROL CHANNEL RESOURCE

(71) Applicant: QUALCOMM Incorporated, San Diego, CA (US)

(72) Inventors: Mostafa Khoshnevisan, San Diego, CA (US); Peter Gaal, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/956,557

(22) Filed: Sep. 29, 2022

(65) Prior Publication Data

US 2023/0179377 A1 Jun. 8, 2023

Related U.S. Application Data

(60) Provisional application No. 63/285,943, filed on Dec. 3, 2021.

(51) Int. Cl.
*H04L 5/00* (2006.01)
(52) U.S. Cl.
CPC ............................. *H04L 5/0055* (2013.01)
(58) Field of Classification Search
CPC ..... H04L 5/0055; H04L 5/001; H04L 5/0094; H04L 5/0007
USPC .................................................. 370/329–330
See application file for complete search history.

(56) References Cited

U.S. PATENT DOCUMENTS

| 2017/0303251 | A1* | 10/2017 | Ko | H04W 88/08 |
|---|---|---|---|---|
| 2021/0243767 | A1* | 8/2021 | Suzuki | H04L 5/0007 |
| 2022/0239418 | A1* | 7/2022 | Jang | H04L 1/08 |
| 2022/0240111 | A1* | 7/2022 | Jang | H04W 24/08 |
| 2022/0369352 | A1* | 11/2022 | Huang | H04L 5/0035 |
| 2022/0408458 | A1* | 12/2022 | MolavianJazi | H04W 72/0453 |
| 2023/0156743 | A1* | 5/2023 | Seok | H04L 5/0094 |
| | | | | 370/329 |
| 2023/0262705 | A1* | 8/2023 | Choi | H04W 72/23 |
| | | | | 370/329 |

OTHER PUBLICATIONS

International Search Report and Written Opinion—PCT/US2022/045367—ISA/EPO—Jan. 19, 2023.

(Continued)

*Primary Examiner* — Candal Elpenord
(74) *Attorney, Agent, or Firm* — QUALCOMM Incorporated

(57) ABSTRACT

Aspects relate to transmission of physical uplink control channel (PUCCH) information. A user equipment may receive a first physical downlink control channel (PDCCH) candidate carried by a control resource set that also carries a second PDCCH candidate, where these PDCCH candidates are associated with different aggregation levels. The user equipment may identify a PUCCH resource for transmission of information (e.g., an ACK or a NACK) that is associated with a physical downlink shared channel (PDSCH) transmission scheduled by the first PDCCH candidate. For example, the user equipment may identify the PUCCH resource based on a control channel element (CCE) index that corresponds to a starting CCE of the first PDCCH candidate and the second PDCCH candidate.

22 Claims, 18 Drawing Sheets

(56) References Cited

OTHER PUBLICATIONS

Moderator (Qualcomm): "Summary #2 of [106bis-e-NR-feMIMO-02] Email Discussion on multi-TRP for PDCCH", 3GPP TSG-RAN WG1 Meeting #106-bis-e, R1-2110439, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 13, 2021, 69 Pages, XP052061114, p. 28, 36.

Moderator (Qualcomm): "Summary #2 of [107-e-NR-feMIMO-02] Email Discussion on multi-TRP for PDCCH", 3GPP TSG-RAN WG1 Meeting #107-e, R1-2112454, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 17, 2021, 42 Pages, XP052082082, p. 1, 3, 33, Figure 1.

3GPP: "3rd Generation Partnership Project, Technical Specification Group Radio Access Network, NR, Physical layer procedures for control (Release 17)", 3GPP TS 38.213, V17.13.0, Jun. 2025, pp. 1-268.

\* cited by examiner

IDENTIFICATION OF CONTROL CHANNEL RESOURCE

CROSS-REFERENCE TO RELATED APPLICATIONS

The present application for patent claims priority to and the benefit of U.S. Provisional Application No. 63/285,943, titled "IDENTIFICATION OF CONTROL CHANNEL RESOURCE" filed Dec. 3, 2021, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to identifying a resource for transmission of physical uplink control channel information.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment may include a transceiver, a memory, and a processor coupled to the transceiver and the memory. The processor and the memory may be configured to receive, via the transceiver, a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set. The processor and the memory may also be configured to transmit, via the transceiver, the PUCCH with the acknowledgement information on a PUCCH resource identified based at least in part on a first control channel element (CCE) index that corresponds to a starting CCE of the first PDCCH candidate and the second PDCCH candidate.

In some examples, a method for wireless communication at a user equipment is disclosed. The method may include receiving a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set. The method may also include transmitting the PUCCH with the acknowledgement information on a PUCCH resource identified based at least in part on a first control channel element (CCE) index that corresponds to a starting CCE of the first PDCCH candidate and the second PDCCH candidate.

In some examples, a user equipment may include means for receiving a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set. The user equipment may also include means for transmitting the PUCCH with the acknowledgement information on a PUCCH resource identified based at least in part on a first control channel element (CCE) index that corresponds to a starting CCE of the first PDCCH candidate and the second PDCCH candidate.

In some examples, a non-transitory computer-readable medium has stored therein instructions executable by one or more processors of a user equipment to receive a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set. The non-transitory computer-readable medium may also have stored therein instructions executable by one or more processors of the user equipment to transmit the PUCCH with the acknowledgement information on a PUCCH resource identified based at least in part on a first control channel element (CCE) index that corresponds to a starting CCE of the first PDCCH candidate and the second PDCCH candidate.

In some examples, a user equipment may include a transceiver, a memory, and a processor coupled to the transceiver and the memory. The processor and the memory may be configured to receive, via the transceiver, a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The processor and the memory may also be configured to transmit, via the transceiver, the PUCCH with the acknowledgement information on a PUCCH resource identified based at least in part on a first CCE index that corresponds to a starting CCE of the fourth PDCCH candidate associated with the second aggregation level that is higher than the first aggregation level.

In some examples, a method for wireless communication at a user equipment is disclosed. The method may include receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The method may also include transmitting the PUCCH with the acknowledgement information on a PUCCH resource identified based at least in part on a first CCE index that corresponds to a starting CCE of the fourth PDCCH candidate associated with the second aggregation level that is higher than the first aggregation level.

In some examples, a user equipment may include means for receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The user equipment may also include means for transmitting the PUCCH with the acknowledgement information on a PUCCH resource identified based at least in part on a first CCE index that corresponds to a starting CCE of the fourth PDCCH candidate associated with the second aggregation level that is higher than the first aggregation level.

In some examples, a non-transitory computer-readable medium has stored therein instructions executable by one or more processors of a user equipment to receive a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The non-transitory computer-readable medium may also have stored therein instructions executable by one or more processors of the user equipment to transmit the PUCCH with the acknowledgement information on a PUCCH resource identified based at least in part on a first CCE index that corresponds to a starting CCE of the fourth PDCCH candidate associated with the second aggregation level that is higher than the first aggregation level.

In some examples, a user equipment may include a transceiver, a memory, and a processor coupled to the transceiver and the memory. The processor and the memory may be configured to receive, via the transceiver, a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The processor and the memory may also be configured to transmit, via the transceiver, the PUCCH with the acknowledgement information on a PUCCH resource identified based at least in part on a first CCE index that corresponds to a starting CCE of the third PDCCH candidate associated with the first aggregation level that is lower than the second aggregation level.

In some examples, a method for wireless communication at a user equipment is disclosed. The method may include receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The method may also include transmitting the PUCCH with the acknowledgement information on a PUCCH resource identified based at least in part on a first CCE index that corresponds to a starting CCE of the third PDCCH candidate associated with the first aggregation level that is lower than the second aggregation level.

In some examples, a user equipment may include means for receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The user equipment may also include means for transmitting the PUCCH with the acknowledgement information on a PUCCH resource identified based at least in part on a first CCE index that corresponds to a starting CCE of the third PDCCH candidate associated with the first aggregation level that is lower than the second aggregation level.

In some examples, a non-transitory computer-readable medium has stored therein instructions executable by one or more processors of a user equipment to receive a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. The non-transitory computer-readable medium may also have stored therein instructions executable by one or more processors of the user equipment to transmit the PUCCH with the acknowledgement information on a PUCCH resource identified based at least in part on a first CCE index that corresponds to a starting CCE of the third PDCCH candidate associated with the first aggregation level that is lower than the second aggregation level.

In some examples, a user equipment may include a transceiver, a memory, and a processor coupled to the transceiver and the memory. The processor and the memory may be configured to receive, via the transceiver, a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set. The processor and the memory may also be configured to transmit, via the transceiver, the PUCCH with the acknowledgement information on a PUCCH resource identified based at least in part on a first CCE index that corresponds to the second starting CCE.

In some examples, a method for wireless communication at a user equipment is disclosed. The method may include receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set. The method may also include transmitting the PUCCH with the acknowledgement information on a PUCCH resource identified based at least in part on a first CCE index that corresponds to the second starting CCE.

In some examples, a user equipment may include means for receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set. The user equipment may also include means for transmitting the PUCCH with the acknowledgement information on a PUCCH resource identified based at least in part on a first CCE index that corresponds to the second starting CCE.

In some examples, a non-transitory computer-readable medium has stored therein instructions executable by one or more processors of a user equipment to receive a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set. The non-transitory computer-readable medium may also have stored therein instructions executable by one or more processors of the user equipment to transmit the PUCCH with the acknowledgement information on a PUCCH resource identified based at least in part on a first CCE index that corresponds to the second starting CCE.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
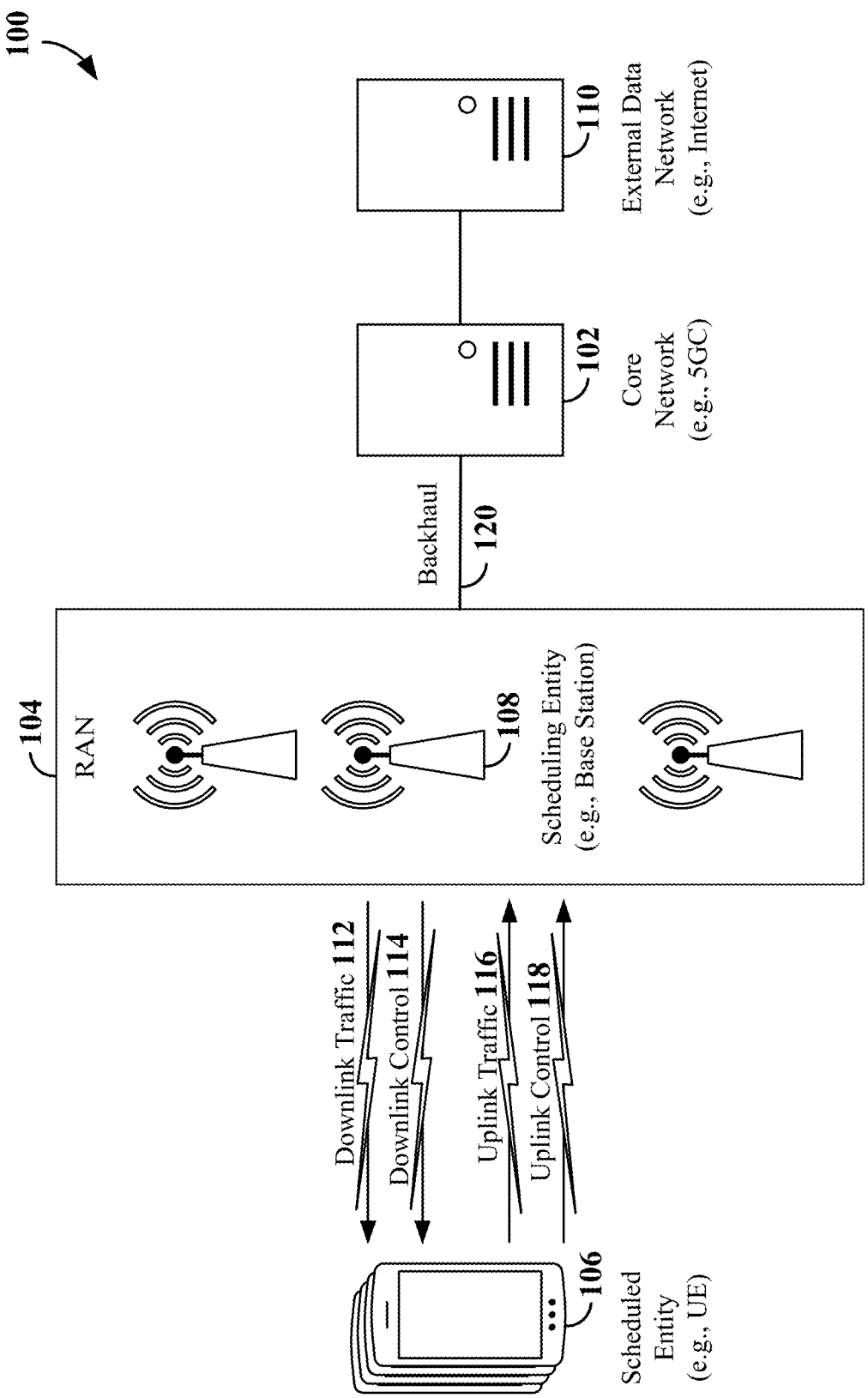
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to transmission of physical uplink control channel (PUCCH) information. A user equipment (UE) may receive physical downlink control channel (PDCCH) candidates that carry downlink control information (DCI) from a network entity such as base station via at least one control resource set. In some situations, these PDCCH candidates may be repeated (e.g., in different control resource sets) and may be associated with different aggregation levels.

The UE may identify a PUCCH resource for transmission of information (e.g., a positive acknowledgement (ACK) or a negative acknowledgement (NACK)) that is to be sent in response to a DCI carried by at least one of the PDCCH candidates. In some examples, the identification of such a PUCCH resource may be based at least in part on a control channel element (CCE) index that corresponds to a starting CCE of the PDCCH candidate that carries the DCI. In certain situations (e.g., where the PDCCH candidates are repeated and have different aggregation levels), there may be an ambiguity as to which starting CCE is to be used as a basis for the PUCCH resource determination.

The disclosure relates in some aspects to various rules for specifying a specific starting CCE for determining a PUCCH resource. In some examples, a UE may identify the PUCCH resource based on a CCE index that corresponds to a starting CCE of a first PDCCH candidate and a second PDCCH candidate (i.e., the PDCCH candidates have the same starting CCE). In some examples, a UE may identify the PUCCH resource based on a CCE index that corresponds to a starting CCE of a PDCCH candidate that is associated with a higher aggregation level than another PDCCH candidate. In some examples, a UE may identify the PUCCH resource based on a CCE index that corresponds to a starting CCE of a PDCCH candidate that is associated with a lower aggregation level than another PDCCH candidate. In some examples, a UE may identify the PUCCH resource based on a CCE index that corresponds to a starting CCE of a PDCCH candidate that has a higher starting CCE than another PDCCH candidate.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element (e.g., a network entity) in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
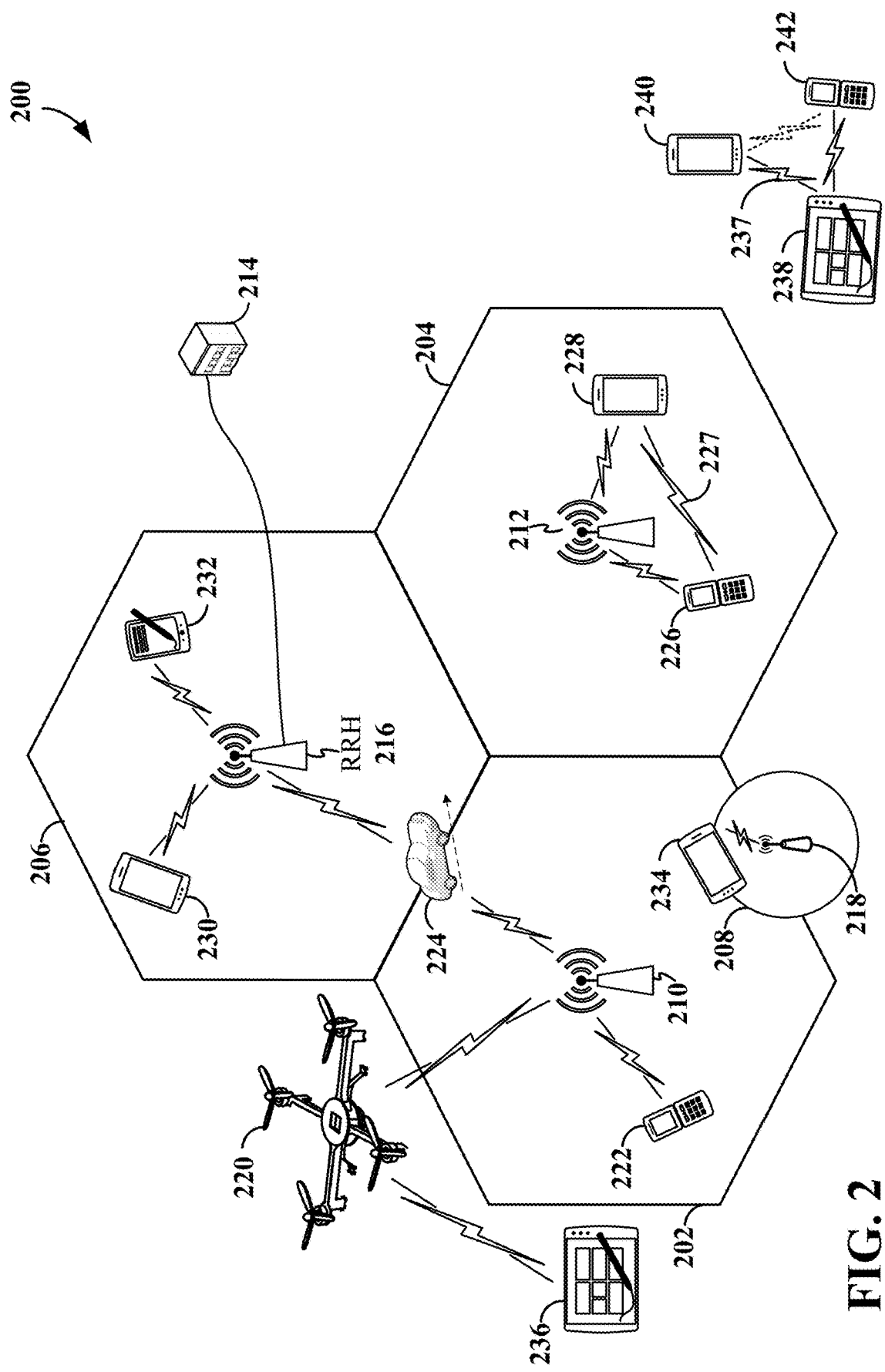
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station.

In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
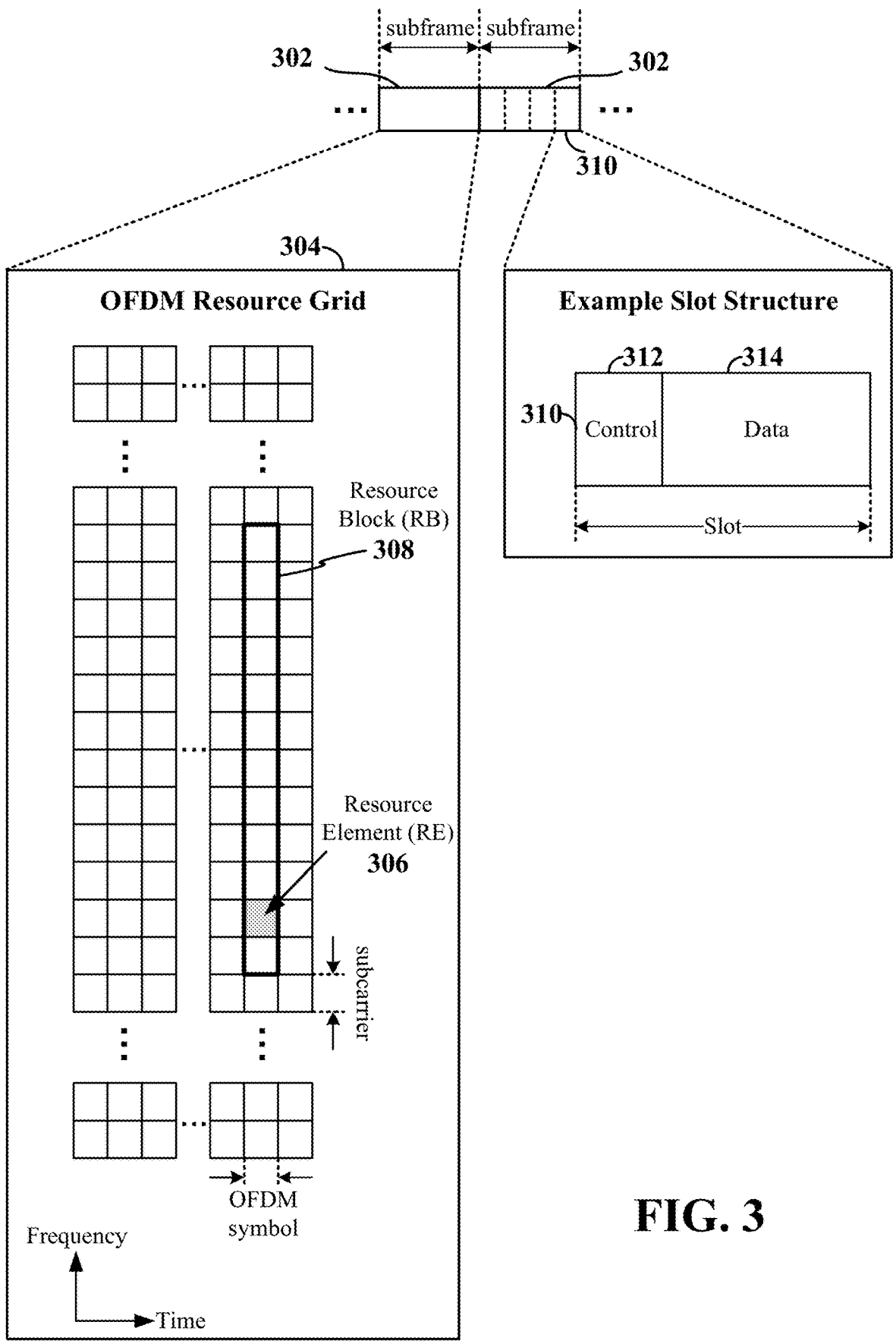
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a network entity (e.g., a gNB, an eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network entity) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an ACK or a NACK. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space (SS) for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
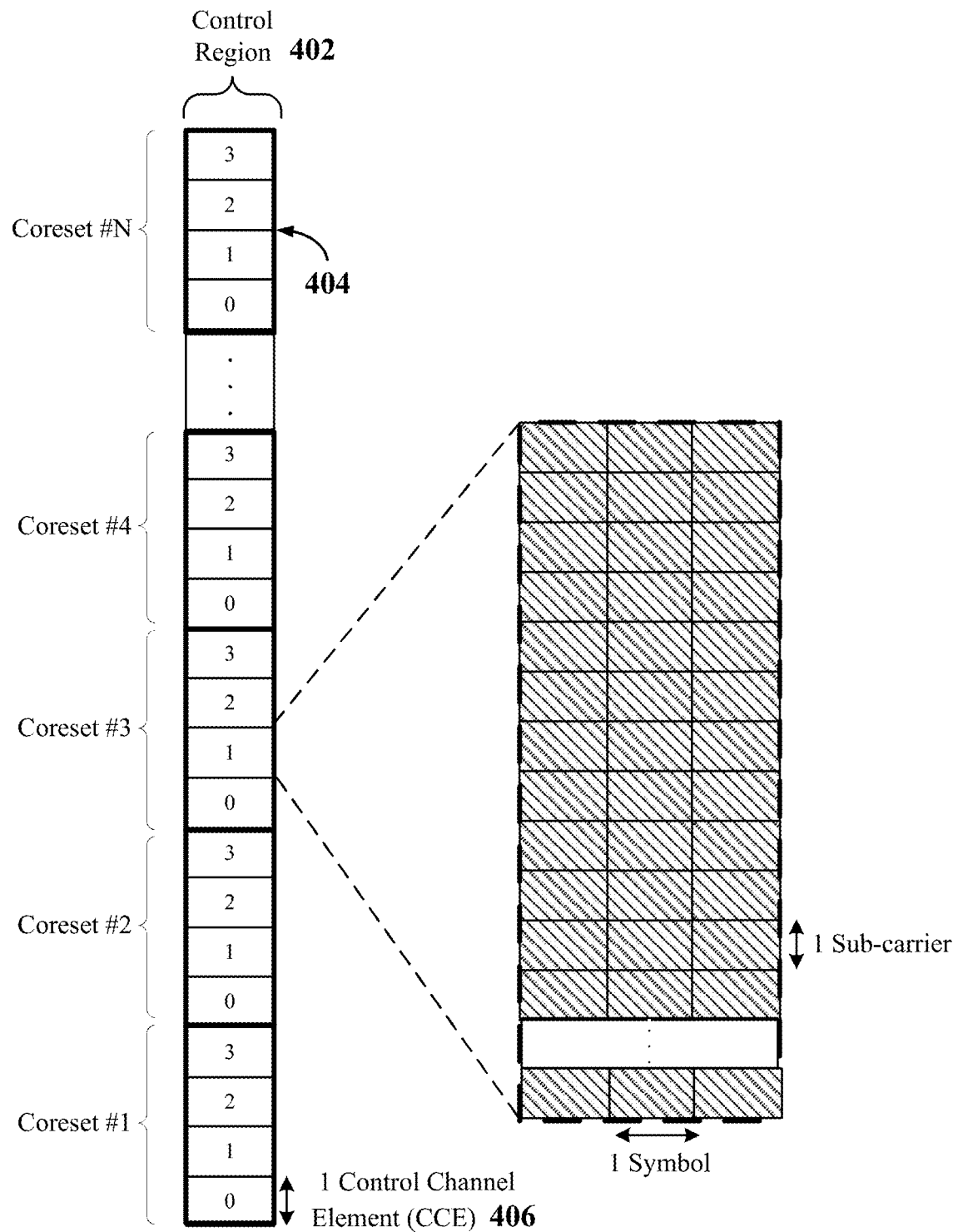
FIG. 4 is a schematic illustration of an example of a downlink control region of a slot according to some aspects.
Figure 5:
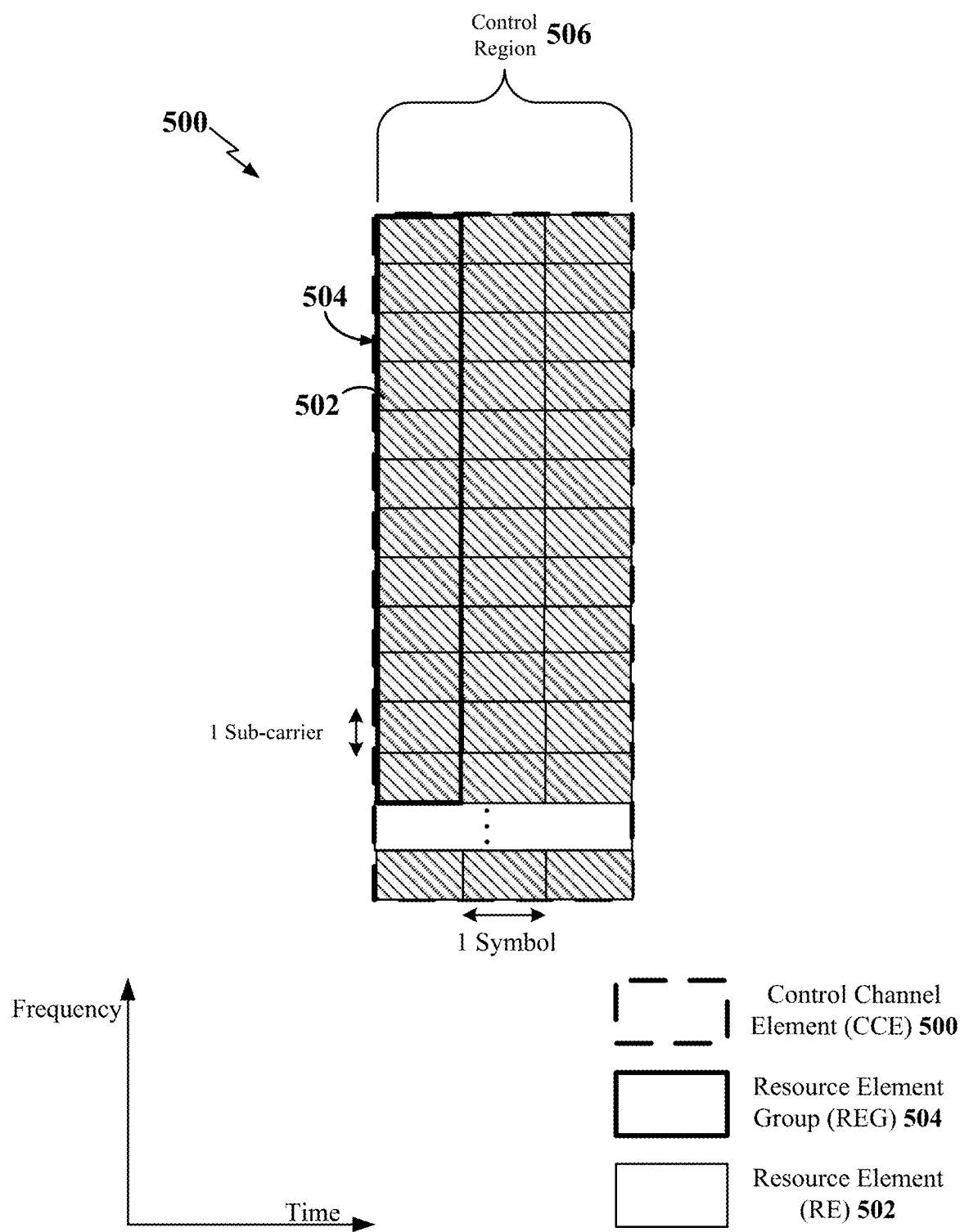
FIG. 5 is a schematic illustration of an example of a control channel element structure according to some aspects.

As mentioned above, a network entity (e.g., a base station) may use a downlink control region of a slot to send PDCCH information to a UE. In some examples, the PDCCH information may be a scheduling DCI that schedules a downlink transmission to a UE, an uplink transmission by a UE, or some other transmission. In some examples, the PDCCH information may be a non-scheduling DCI (e.g., a DCI that carries information, but does not schedule a transmission). FIGS. 4 and 5 describe examples resource configurations that may be used to carry such PDCCH information.

FIG. 4 is a schematic illustration of an example of a downlink (DL) control region 402 of a slot according to some aspects. The DL control region 402 may correspond, for example, to the control region 312 of the slot 310 illustrated in FIG. 3. As discussed above, the DL control region 402 may carry a PDCCH that includes one or more DCIs.

The DL control region 402 includes a plurality of CORE-SETs 404 indexed as CORESET #1-CORESET #N. Each CORESET 404 includes a number of sub-carriers in the frequency domain and one or more symbols in the time domain. In the example of FIG. 4, each CORESET 404 includes at least one control channel element (CCE) 406 having dimensions in both frequency and time, sized to span across at least three OFDM symbols. A CORESET 404 having a size that spans across two or more OFDM symbols may be beneficial for use over a relatively small system bandwidth (e.g., 5 MHz). However, a one-symbol CORE-SET may also be possible.

In some examples, a network entity may configure a CORESET 404 for carrying group common control information or UE-specific control information, whereby the CORESET 404 may be used for transmission of a PDCCH including the group common control information or the UE-specific control information to one or more UEs. Each UE may be configured to monitor one or more CORESETs 404 for the UE-specific or group common control information (e.g., on a PDCCH).

In some examples, the PDCCH may be constructed from a variable number of CCEs, depending on the PDCCH format (e.g., aggregation level). Each PDCCH format (e.g., aggregation level) supports a different DCI length. In some examples, PDCCH aggregation levels of 1, 2, 4, 8, and 16 may be supported, corresponding to 1, 2, 4, 8, or 16 contiguous CCEs, respectively.

FIG. 5 is a schematic illustration of an example of a CCE structure 500 in a DL control region 506 of a slot according to some aspects. The DL control region 506 may correspond, for example, to the control region 312 of the slot 310 illustrated in FIG. 3. The CCE structure 500 includes a number of REs 502 that may be grouped into at least one RE group (REG) 504. Each REG 504 generally may contain, for example, twelve consecutive REs 502 (or nine REs 502 and three DMRS REs) within the same OFDM symbol and the same RB. In the example of FIG. 5, the CCE structure 500 includes at least six REGs 504 (not shown in their entirety) distributed across three OFDM symbols. However, as those skilled in the art will readily appreciate, the CCE structure 500 for any particular application may vary from the example described herein, depending on any number of factors. For example, the CCE structure 500 may contain any suitable number of REGs.

In some examples, a UE may be unaware of the particular aggregation level of the PDCCH or whether multiple PDCCHs may exist for the UE in the slot. Consequently, the UE may perform blind decoding of various PDCCH candidates within the first N control OFDM symbols of the slot (as indicated by the slot format of the slot) and/or other OFDM symbols of the slot. In some examples, this decoding is based on an radio network temporary identifier (RNTI) (e.g., a UE-specific RNTI or a group RNTI) that the network entity is expected to use when encoding the PDCCH. Each PDCCH candidate includes a collection of one or more consecutive CCEs based on an assumed DCI length (e.g., PDCCH aggregation level). The term PDCCH candidate is used here to emphasize that the UE might not be configured with information indicating exactly what type of PDCCH is carried within a slot or where a particular PDCCH is carried within a slot. Thus, with blind decoding, the UE attempts to decode signals received on different sets of resource (e.g., corresponding to different PDCCH candidates) to determine whether those resources are actually carrying a PDCCH.

To limit the number of blind decodes performed by a UE, a network entity may configure certain search spaces such as UE-specific search spaces (USSs) and common search spaces (CSSs). Here, the network entity may send a PDCCH to a UE or a set of UEs only on the resources specified for the configured search space(s). Thus, the UE or UEs may limit their blind decoding to the configured search space(s). In some examples, the network entity may configure one or more search space sets, each of which includes at least one search space. In some examples, different search space sets may be assigned different search space set identifiers (IDs). In some examples, a search space set ID may be referred to as a search space set index.

A UE-specific search space sets consist of CCEs used for sending control information to a particular UE. The starting point (offset or index) of a UE-specific search space may be different for each UE. In addition, each UE may have multiple UE-specific search spaces (e.g., one for each aggregation level).

A common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group and there may be multiple search space sets defined for group common control information (e.g., one for each configured aggregation level for the group of UEs).

The UE may perform blind decoding over all aggregation levels and corresponding USSs or CSSs to determine whether at least one valid DCI is carried by the UE-specific search space (USS) or the common search space (CSS) for the UE. By using search space sets (e.g., USSs and CSSs) configured for a UE for this blind decoding, the number of blind decodes that the UE performs for each PDCCH format combination may be reduced.

A UE may monitor a search space for downlink assignments and uplink grants relating to a particular component carrier for the UE. For example, the UE may monitor the search space for a PDCCH that includes a DCI that schedules a PDSCH in the same slot or in a different slot for that component carrier. In this case, the DCI includes a frequency domain resource assignment and a time domain resource assignment for a PDSCH and other information (e.g., MCS etc.) that enables the UE to decode the PDSCH.

Figure 6:
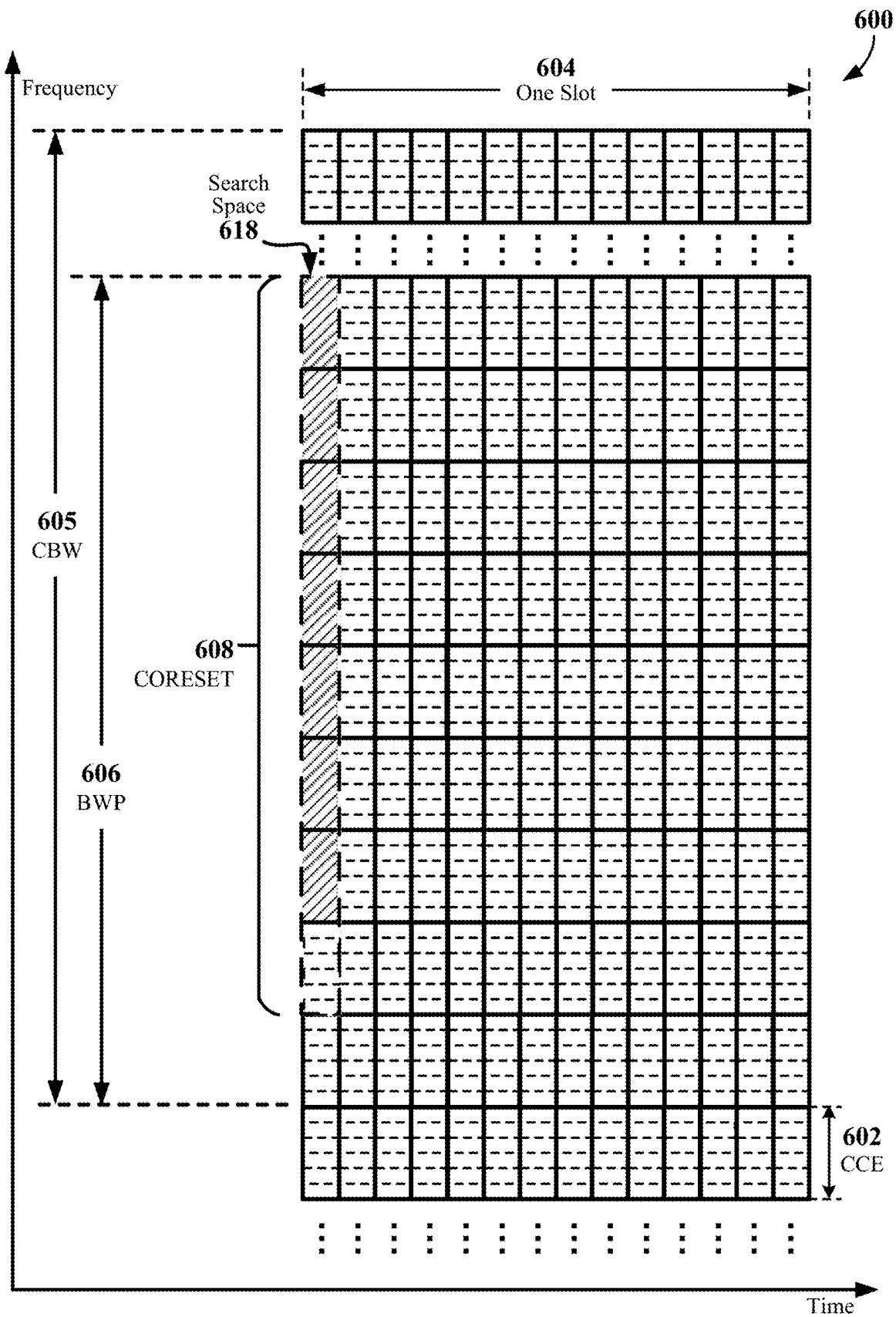
FIG. 6 is a schematic illustration of an example of downlink time-frequency resources according to some aspects.

FIG. 6 is a schematic illustration of an example of downlink time-frequency resources 600, where a search space is defined within a CORESET. In FIG. 6, time is in the horizontal direction with units of OFDM symbols and frequency is in the vertical direction with units of CCEs. For example, the vertical dimension of each major solid line rectangle represents one CCE 602. Each CCE 602 includes 6 resource element groups (REGs). Each REG may correspond to one physical resource block (PRB), including 12 resource elements (REs) in the frequency domain and one OFDM symbol in the time domain. The 6 REGs of each CCE 602 are respectively represented by a minor dashed line rectangle. One slot 604 in the time domain is represented. Other resource configurations may be used in other examples.

FIG. 6 depicts one bandwidth part (BWP) 606 within a carrier bandwidth (CBW) 605. According to some aspects, the BWP 606 is a contiguous set of physical resource blocks (PRBs) on a given carrier. In FIG. 6, the contiguous set of PRBs are represented by a contiguous set of CCEs 602. In the example of FIG. 6, the BWP 606 corresponds to a set of 64 PRBs, which represent 648 subcarriers (i.e., 12 REs/REG×6 REGs/CCE×9 CCE). A network entity may configure different sets of these CCEs as common CCEs or UE-specific CCEs.

In FIG. 6, for example, a CORESET 608 includes 48 REGs in one set of eight CCEs (where each CCE may be similar to CCE 602). The eight CCEs may be grouped as a first DCI.

A CORESET may include a one or more search spaces. A search space 618 include all or a portion of a CORESET. A CORESET may be associated with a common search space, a UE-specific search space, or a combination of both. In the example of FIG. 6, one search space (SS) 618 is indicated for the CORESET 608 (represented by the slanted lines).

A search space may include a number of PDCCH candidates. As mentioned above, a UE may attempt to blind decode a PDCCH candidate in each search space; even if a network entity did not schedule a PDCCH in any given search space.

The following relationships between CORESETs, BWPs, and search spaces are made with reference to some examples of NR; however, the following is exemplary and non-limiting and other relationships between CORESETs, BWPs, and search spaces (or their equivalents, for example in other radio technologies) are within the scope of the disclosure. In some examples, for a given UE a network entity may configure up to three CORESETs in a BWP of a serving cell (e.g., a component carrier (CC)), including both common and UE-specific CORESET. In addition, the network entity may configure up to four BWPs per serving cell, with one of the BWPs active at a given time. Accordingly, a maximum number of CORESETs for a UE per serving cell may be twelve (e.g., 3 CORESETs per BWP×4 BWPs per serving cell) in these examples. The resource elements of a CORESET may be mapped to one or more CCEs. One or more CCEs from one CORESET may be aggregated to form the resources used by one PDCCH. In some examples, the maximum number of search spaces per BWP may be ten (10). In some examples, multiple search spaces may use the time-frequency resources of one CORESET.

A network entity may send a PDCCH to a UE via the downlink time-frequency resources 600 (e.g., within a configured search space). In some examples, the network entity may compute a cyclic redundancy check (CRC) of a payload of a DCI carried by a PDCCH. The CRC may be scrambled using an identifier of a UE. An example of such an identifier may be a radio network temporary identifier (RNTI), such as a random access-radio network temporary identifier (RA-RNTI).

During blind decoding of a search space, the UE may attempt to descramble CRC of a PDCCH candidate using the RNTI. For example, the UE may compute a CRC on the payload of the corresponding DCI using the same procedure as used by the network entity, and then compare the CRCs. If the CRCs are equal, the DCI was destined for the UE. If the payload was corrupted or the CRC was scrambled using another UE's RNTI, then the CRCs would not match, and the UE may disregard the DCI.

As mentioned above, a network entity may configure a UE with up to 3 CORESETs per BWP, where each CORESET may be associated with one active transmission configuration indication (TCI) state. As part of each CORESET configuration, the network entity may use a radio resource control (RRC) configuration message to configure the RBs of a CORESET in the frequency domain and the number of symbols of a CORESET (e.g., 1,2,3 or OFDM symbols). In addition, an SS set may be associated with a CORESET.

The network entity may use an RRC configuration message to configure various parameters as part of an SS set configuration. Examples of these parameters include, without limitation, the associated CORESET, the periodicity and offset of the monitoring slots, the monitoring symbols within a slot (e.g., used to determine PDCCH monitoring occasions (MOs) of the SS set), the SS set type (e.g., a common SS (CSS) or a UE-specific SS (USS)), the DCI formats to monitor, and the number of PDCCH candidates for a given aggregation level (e.g., corresponding to a number of CCEs).

In some examples, PDCCH candidates are defined as part of SS set configurations. For example, a PDCCH candidate with a given aggregation level (AL) and a given candidate index may be defined in a given SS set.

As discussed above, a UE may receive a DCI via a PDCCH candidate. For example, a UE may monitor for PDCCH candidates in the designated SS sets, by blindly decoding the SS sets. When one or more of the PDCCH candidates passes a CRC check (successful decoding), at least one DCI will be successfully decoded.

In some examples, a network entity may use PDCCH repetition, where each repetition is a PDCCH candidate. For example, two PDCCH candidates may be linked together for repetition of the same DCI. The two PDCCH candidates may have the same aggregation level (e.g., the same number of CCEs), and the DCI payload transmitted using the two PDCCH candidates may be the same. Thus, a UE that is informed of the linked PDCCH candidates can perform soft combining to decode the DCI, or the UE may individually decode the two PDCCH candidates.

Figure 7:
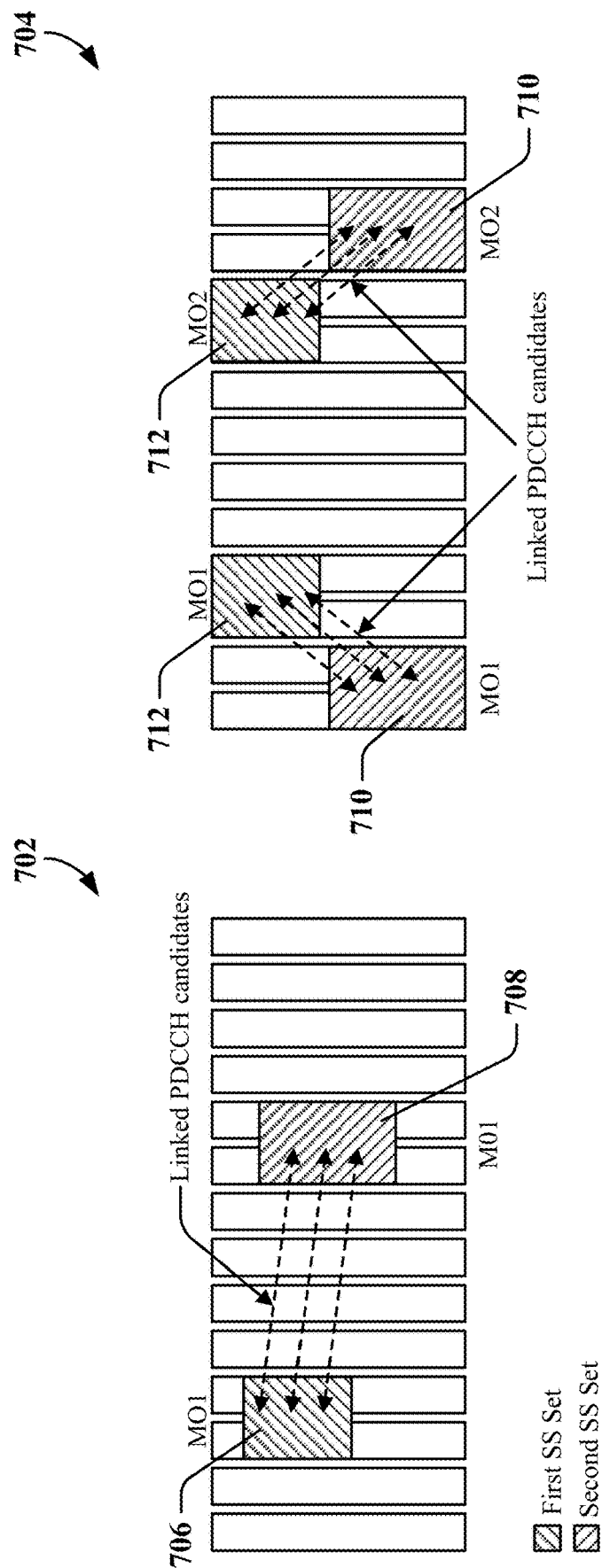
FIG. 7 is a diagram illustrating examples of physical downlink control channel (PDCCH) repetition according to some aspects.

FIG. 7 illustrates a first example 702 of linked PDCCH candidates and a second example 704 of linked PDCCH candidates. The first example 702 includes a first SS set 706 and a second SS set 708. PDCCH candidates within a monitoring occasion (MO1) of the first SS set 706 are linked to PDCCH candidates within a monitoring occasion (MO1) of the second SS set 708. For example, a first PDCCH candidate of the first SS set 706 is linked to a first PDCCH candidate of the second SS set 708, a second PDCCH candidate of the first SS set 706 is linked to a second PDCCH candidate of the second SS set 708, and so on. In some aspects, the first SS set 706 and the second SS set 708 may be referred to as linked SS sets (e.g., linked for PDCCH repetition) in this example.

The second example 704 includes a first SS set 710 and a second SS set 712. PDCCH candidates within a first monitoring occasion (MO1) of the first SS set 710 are linked to PDCCH candidates within a first monitoring occasion (MO1) of the second SS set 712. In addition, PDCCH candidates within a second monitoring occasion (MO2) of the first SS set 710 are linked to PDCCH candidates within a second monitoring occasion (MO2) of the second SS set 712.

The following linking rules may be used in some examples. Two SS sets are linked by RRC configurations, where the MOs of the two linked SS sets are one-to-one mapped and PDCCH candidates with the same aggregation level and the same candidate indices for the two linked SS sets are linked. Here, two linked SS sets may be configured with the same number of candidates for each aggregation level.

In some examples, a DCI carried by a PUCCH may schedule resources for one or more of PDSCH transmission, a PUSCH transmission, a PUCCH transmission, or some other type of transmission. For example, a DCI may schedule a PDSCH transmission and a PUCCH transmission for the associated HARQ-Ack (e.g., an ACK or NACK). As another example, a DCI that does not schedule a PDSCH or a PUSCH may still schedule a PUCCH transmission for a HARQ-Ack associated with the DCI (e.g., so the UE can send an ACK or a NACK to acknowledge the DCI).

A PUCCH resource indicator (PRI) in a DCI (e.g., a DCI scheduling a HARQ-Ack on a PUCCH) may signal possibilities for PUCCH resources within a PUCCH resource set to be used by the UE for the PUCCH transmission. In some examples, a PRI has 3 bits. Thus, this PCI can signal up to 8 possibilities for PUCCH resources within a PUCCH resource set. However, the first PUCCH resource set (out of the four sets) can contain up to 32 PUCCH resources in some examples. In this case, the PRI alone does not determine the PUCCH resource for HARQ-ACK transmission. To address this issue, the determination of the PUCCH resource may be a function of the PRI, the number of CCEs of the CORESET in which the DCI is received, and an index of the first CCE of the DCI reception in the CORESET. For example, Equation 1 may be used to determine a PUCCH resource index ($r_{PUCCH}$) of a PUCCH resource set ($R_{PUCCH}$), where this determination is based on the PRI ($\Delta_{PRI}$), the number of CCEs of the CORESET in which the DCI is received ($N_{CCE,p}$), and an index of the first CCE of the DCI reception in the CORESET ($n_{CCE,p}$).

PUCCH resource set has a size larger than eight, the starting CCE index and the number of CCEs in the CORESET of one of the linked PDCCH candidates is applied (e.g., for Equation 1).

In some examples, the PDCCH candidate with the lowest SS set ID (e.g., the lowest search space index) may be applied. In this case, a UE may use the starting CCE of the PDCCH candidate and the number of CCEs of the CORESET associated with the lower SS set ID (SS set 1) for $n_{CCE}$ and $N_{CCE}$ of Equation 1, respectively.

Figure 8:
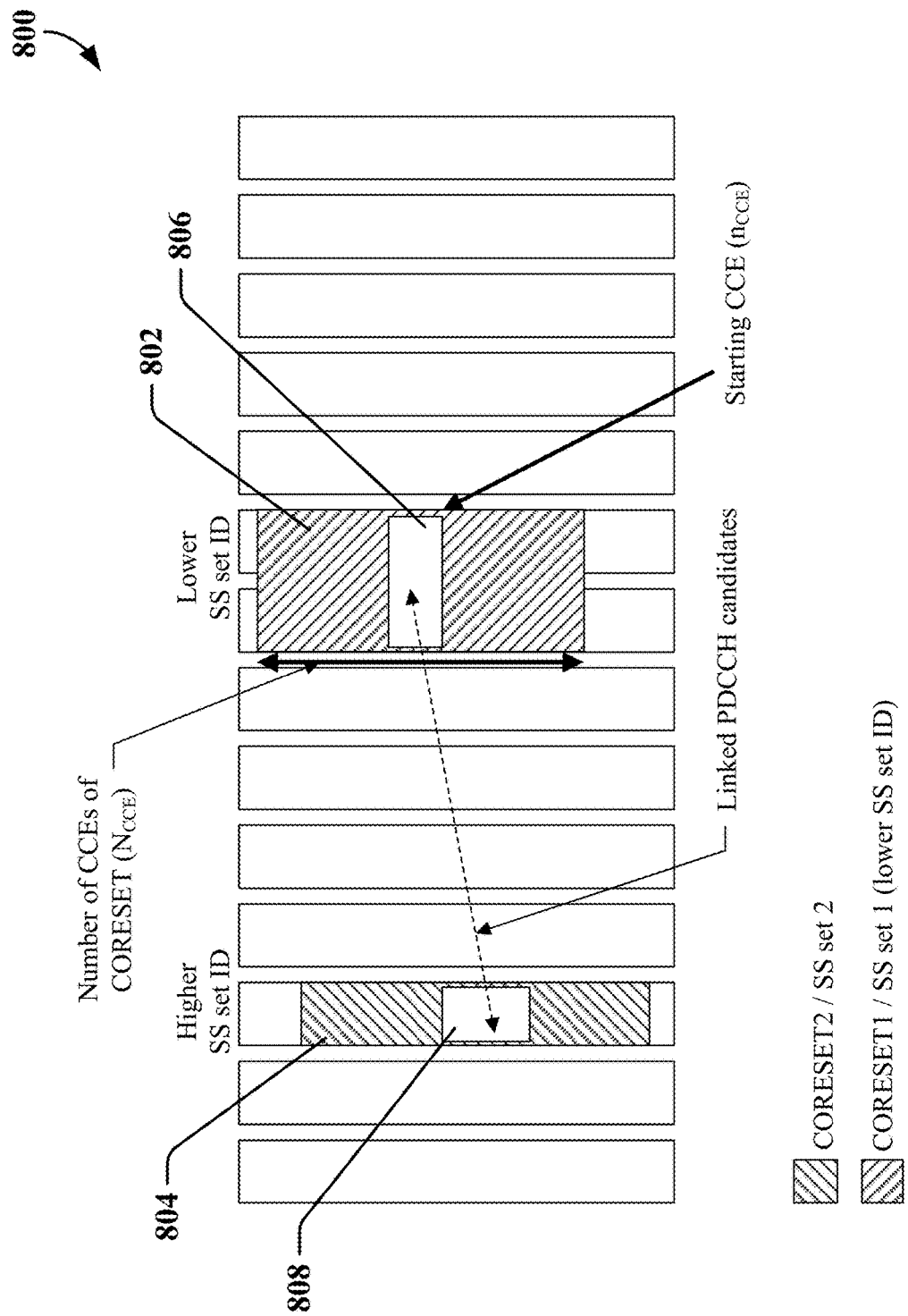
FIG. 8 is a diagram illustrating an example of linked PDCCH candidates according to some aspects.

FIG. 8 illustrates an example 800 of linked PDCCH candidates for a scenario where a first CORESET (CORESET 1) 802 is associated with a lower SS set ID than a second CORESET (CORESET 2) 804. Here, a PDCCH candidate 806 of the first CORESET 802 is linked to a PDCCH candidate 808 of the second CORESET 804. In this case, the starting CCE of the PDCCH candidate 806 and the number of CCEs in the first CORESET 802 may be used for $n_{CCE}$ and $N_{CCE}$ of Equation 1, respectively.

In some examples, an ambiguity may arise in the identification of the PUCCH resource when a UE receives a DCI in multiple PDCCH candidates that are linked for repetition and have different aggregation levels. For example, an ambiguity may arise when a UE attempts to decode a search space that includes a first PDCCH candidate with a first aggregation level and a second PDCCH with a second aggregation level.

For example, a UE may use polar coding for transmitting a DCI. In polar coding, a mother code length is defined depending on number of coded bits, which depends on the aggregation level (e.g., AL8 with 8 CCEs, AL16 with 16 CCEs, etc.). For both AL8 and AL16, the length of the original mother code length is the same (e.g., 512 bits). However, the number of coded bits for AL8 may be 864 bits

EQUATION 1

$$r_{PUCCH} = \begin{cases} \left\lfloor \frac{n_{CC,p} \lceil R_{PUCCCH}/8 \rceil}{N_{CC,p}} \right\rfloor + \Delta_{PRI} \cdot \left\lceil \frac{R_{PUCCCH}}{8} \right\rceil & \text{if } \Delta_{PRI} < R_{PUCCCH} \bmod 8 \\ \left\lfloor \frac{n_{CC,p} \lceil R_{PUCCCH}/8 \rceil}{N_{CC,p}} \right\rfloor + \Delta_{PRI} \cdot \left\lceil \frac{R_{PUCCCH}}{8} \right\rceil + R_{PUCCH} \bmod 8 & \text{if } \Delta_{PRI} \geq R_{PUCCCH} \bmod 8 \end{cases}$$

An ambiguity may arise in the identification of the PUCCH resource when a UE receives a DCI in multiple PDCCH candidates that are linked for repetition. This ambiguity may arise because a network entity may decode the DCI only in the first linked candidate, only in the second linked candidate, or in both linked candidates. In this case, the starting DCI used by the UE to identify the PUCCH resource for the HARQ-Ack (e.g., in Equation 1) may be different depending on whether the UE decodes the DCI only in the first linked candidate, only in the second linked candidate, or in both linked candidates.

In some examples, when a UE receives a DCI in PDCCH candidates that are linked for repetition, the following rule may be used to avoid the above ambiguity. When a DL DCI is transmitted via PDCCH repetition, for PUCCH resource determination for HARQ-Ack when the corresponding (e.g., a some of the coded bits are repeated and added to the mother to provide a length of 864 bits). In addition, the number of coded bits for AL16 may be 1728 bits (e.g., the mother code is repeated 3 times and some repeated coded bits are added to this to provide a length of 1728 bits).

In the above encoding scheme, the first eight CCEs of a AL16 candidate can appear as a AL8 candidate to a UE, resulting in an ambiguity. It may be observed that this is an issue only when the starting CCE index is the same for two configured PDCCH candidates with AL8 and AL16 (otherwise the UE would decode the PDCCH candidates separately).

In some examples, this ambiguity is an issue only when two PDCCH candidates are associated with the same CORESET (e.g., AL8 and AL16 PDCCH candidates are in the same SS set; or AL8 and AL16 PDCCH candidates are in different SS sets, but the two SS sets are associated with the same CORESET and have overlapping monitoring occasions, and have the same DCI size). This ambiguity may be avoided if the PDCCH candidates are in different CORESETs, since different scrambling can be used for the different CORESETs.

In some examples, this ambiguity is an issue only for a single-symbol non-interleaved CORESET. Otherwise, due to frequency-domain, first time-domain, second mapping, this issue may be avoided.

In view of the above, when in two linked SS sets (associated with corresponding CORESETs), there are two linked AL8 candidates and two linked AL16 candidates, and where in the SS set with the higher ID (e.g., SS set 2), an AL8 PDCCH candidate and an AL16 PDCCH candidate have the same start CCE, and the DCI is decoded using one of these two PDCCH candidates, the UE might not be able to distinguish whether the DCI is from the AL8 PDCCH candidate or the AL16 PDCCH candidate if the CORESET associated with SS set 2 (e.g., CORESET 2) is one-symbol and non-interleaved.

In the rule discussed above in conjunction with FIG. 8, the UE uses the starting CCE of the PDCCH candidate and the number of CCEs of the CORESET associated with the lower SS set ID (e.g., SS set 1). However, if in the SS set with the lower ID (SS set 1), the AL8 PDCCH candidate and the AL16 PDCCH candidate do not have the same starting CCE, then there may be an ambiguity with respect to which starting CCE is to be used.

Figure 9:
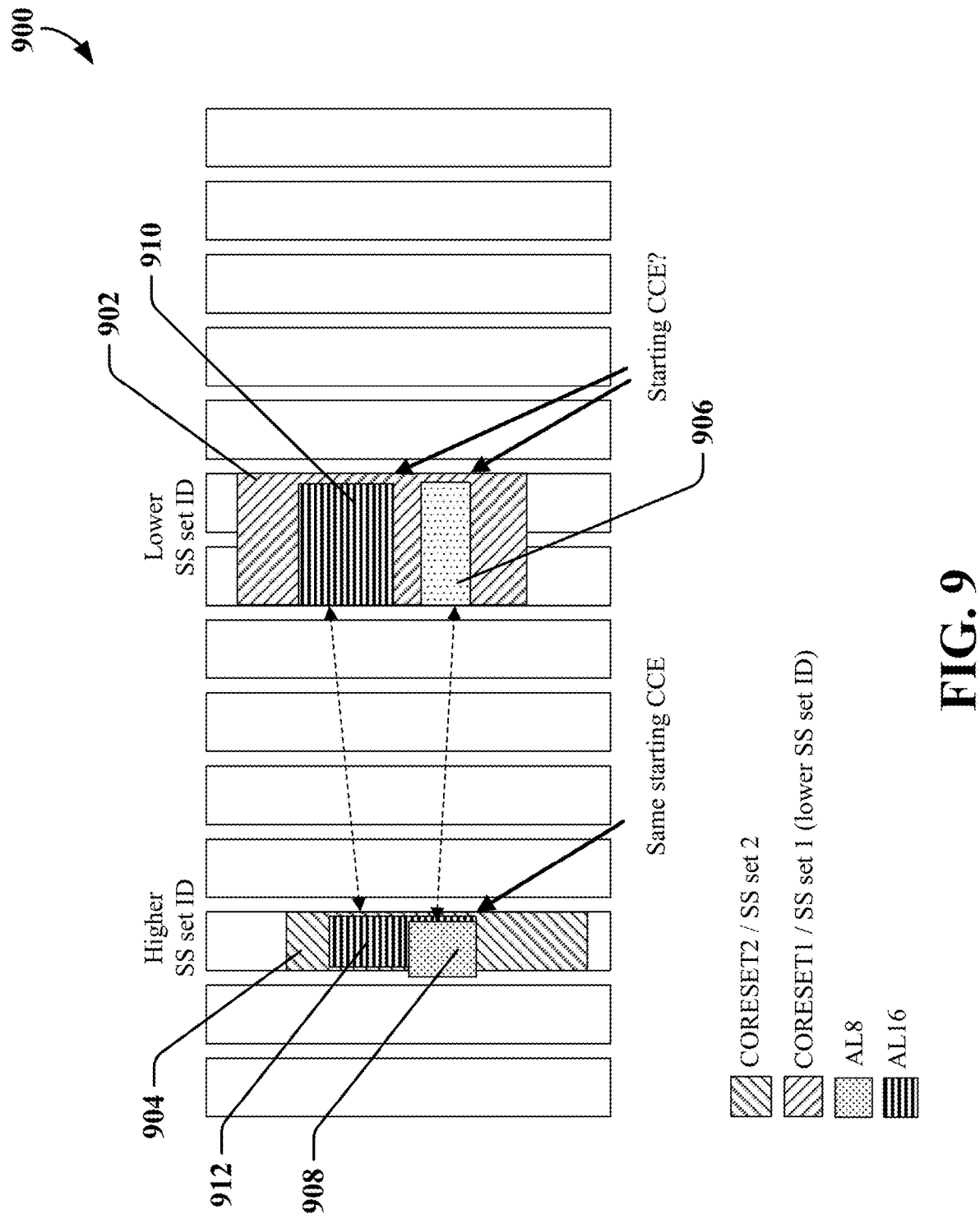
FIG. 9 is a diagram illustrating an example of starting control channel elements (CCEs) for linked PDCCH candidates according to some aspects.

FIG. 9 illustrates an example 900 of linked PDCCH candidates for a scenario where a first CORESET (CORESET 1) 902 is associated with a lower SS set ID than a second CORESET (CORESET 2) 904. Here, a first PDCCH candidate 906 of the first CORESET 902 is linked to a first PDCCH candidate 908 of the second CORESET 904. In addition, a second PDCCH candidate 910 of the first CORESET 902 is linked to a second PDCCH candidate 912 of the second CORESET 904. In addition, the first PDCCH candidates 906 and 908 have a lower aggregation level than the second PDCCH candidates 910 and 912. Also, the first PDCCH candidate 908 and the second PDCCH candidate 912 have the same starting CCE, while the first PDCCH candidate 906 and the second PDCCH candidate 910 have different starting CCEs. Thus, if the rule discussed above in conjunction with FIG. 8 is applied here, there is an ambiguity concerning which starting CCE (the first PDCCH candidate 906 or the second PDCCH candidate 910) is to be used for Equation 1.

The disclosure relates in some aspects to procedures for identifying a starting CCE to be used for identifying a PUCCH resource. In some aspects, these procedures may be used to address the potential ambiguity discussed above when PDCCH candidate repetition and different aggregation levels are used.

In a first example procedure, a UE may use as a reference for the purpose of PUCCH resource determination the SS set in which the PDCCH candidates with different aggregation levels (e.g., an AL8 PDCCH candidate and an AL16 PDCCH candidate) have the same starting CCE. In this case, this common starting CCE and the number of CCEs of the CORESET associated with that SS set may be used (e.g. for Equation 1). The use of this procedure may be irrespective of whether that SS set (e.g., in which the AL8 and AL16 PDCCH candidates have the same starting CCE) has a lower or a higher ID among the two linked SS sets.

In the first example procedure, the following rule may be used for determining the starting CCE. If two PDCCH candidates with different aggregation levels (e.g., AL8 and AL16) have the same starting CCE in a non-interleaved CORESET with one OFDM symbol, and the two PDCCH candidates are in a first SS set that is linked to a second SS set, and if the linked PDCCH candidates (e.g., AL8 PDCCH candidate and AL16 PDCCH candidate) in the second SS set do not have the same starting CCE, the first SS set is used as a reference for PUCCH resource determination for HARQ-Ack when the corresponding PUCCH resource set has a size larger than eight.

In this case, the ambiguity that is caused in an SS set/CORESET does not depend on a reference to be defined in another CORESET/SS set. Thus, network entity (e.g., gNB) scheduling may be more efficient and UE determination of a PUCCH resource may be more efficient. In addition, a network entity might not be informed as to whether one candidate in SS set 1 or in SS set 2 is decoded. Hence, a potential ambiguity that may arise if only the candidate (AL8 or AL16) in SS set 1 is decoded may be avoided in this case.

Figure 10:
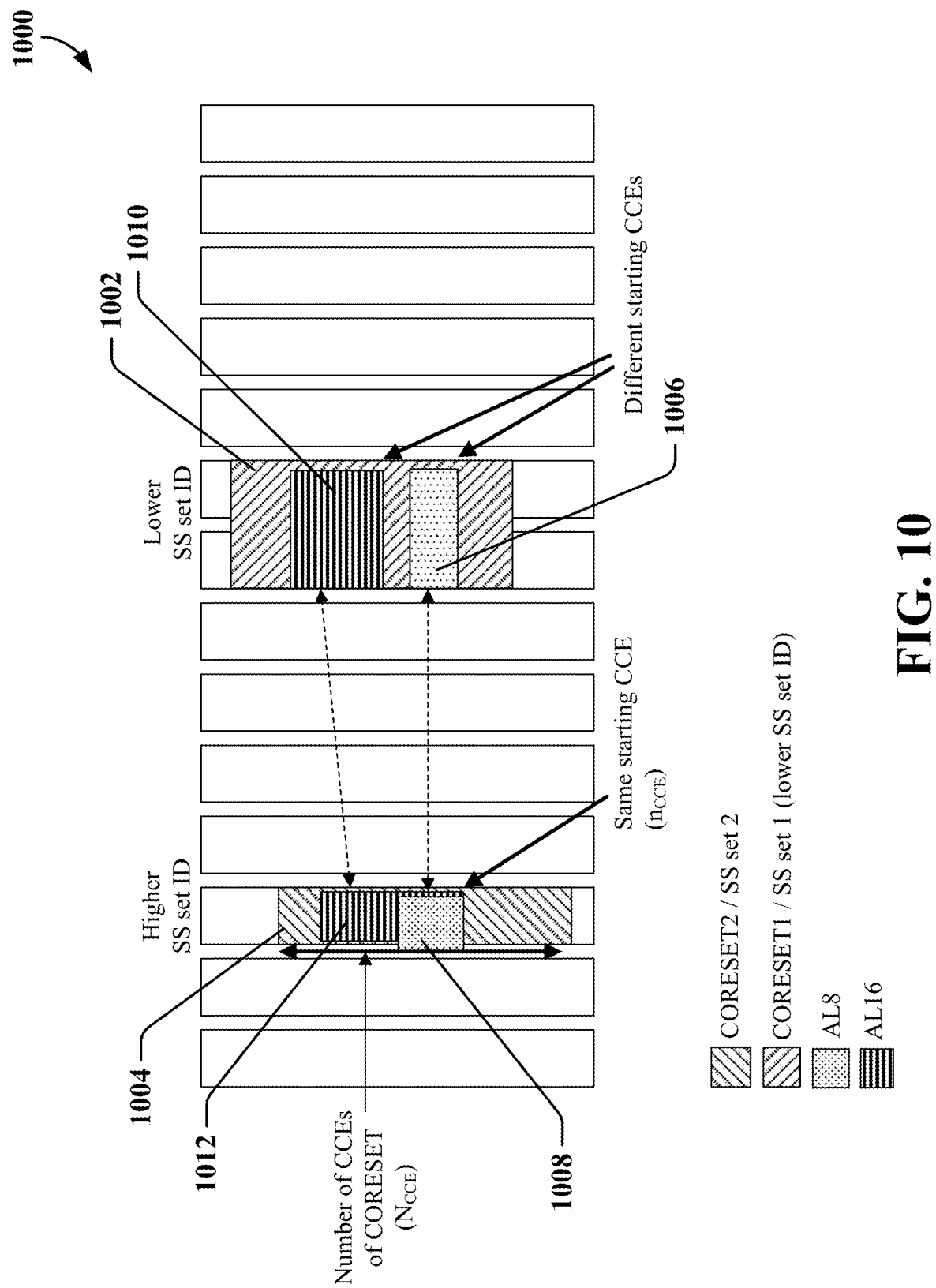
FIG. 10 is a diagram illustrating an example of a starting control channel element (CCE) selected for identifying a physical uplink control channel (PUCCH) resource according to some aspects.

FIG. 10 illustrates an example 1000 where the first example procedure may be used to identify a starting CCE to be used for Equation 1. The example 1000 illustrates linked PDCCH candidates for a scenario where a first CORESET (CORESET 1) 1002 is associated with a lower SS set ID than a second CORESET (CORESET 2) 1004. A first PDCCH candidate 1006 of the first CORESET 1002 is linked to a first PDCCH candidate 1008 of the second CORESET 1004. A second PDCCH candidate 1010 of the first CORESET 1002 is linked to a second PDCCH candidate 1012 of the second CORESET 1004. The first PDCCH candidates 1006 and 1008 have a lower aggregation level than the second PDCCH candidates 1010 and 1012. The first PDCCH candidate 1008 and the second PDCCH candidate 1012 have the same starting CCE, while the first PDCCH candidate 1006 and the second PDCCH candidate 1010 have different starting CCEs. In this case, the common starting CCE for the first PDCCH candidate 1008 and the second PDCCH candidate 1012 may be used as the starting CCE ($n_{CCE}$) for Equation 1. In addition, the number of CCEs of the second CORESET 1004 may be used as the number of CCEs ($N_{CCE}$) for Equation 1.

In second, third, and fourth example procedures, a UE use the number of CCEs of the CORESET associated with the lower SS set ID (e.g., CORESET 1) and one of the two starting CCEs of the PDCCH candidates with different aggregation levels (e.g., AL8 and AL16) in SS set 1 as a reference for PUCCH resource determination.

Figure 11:
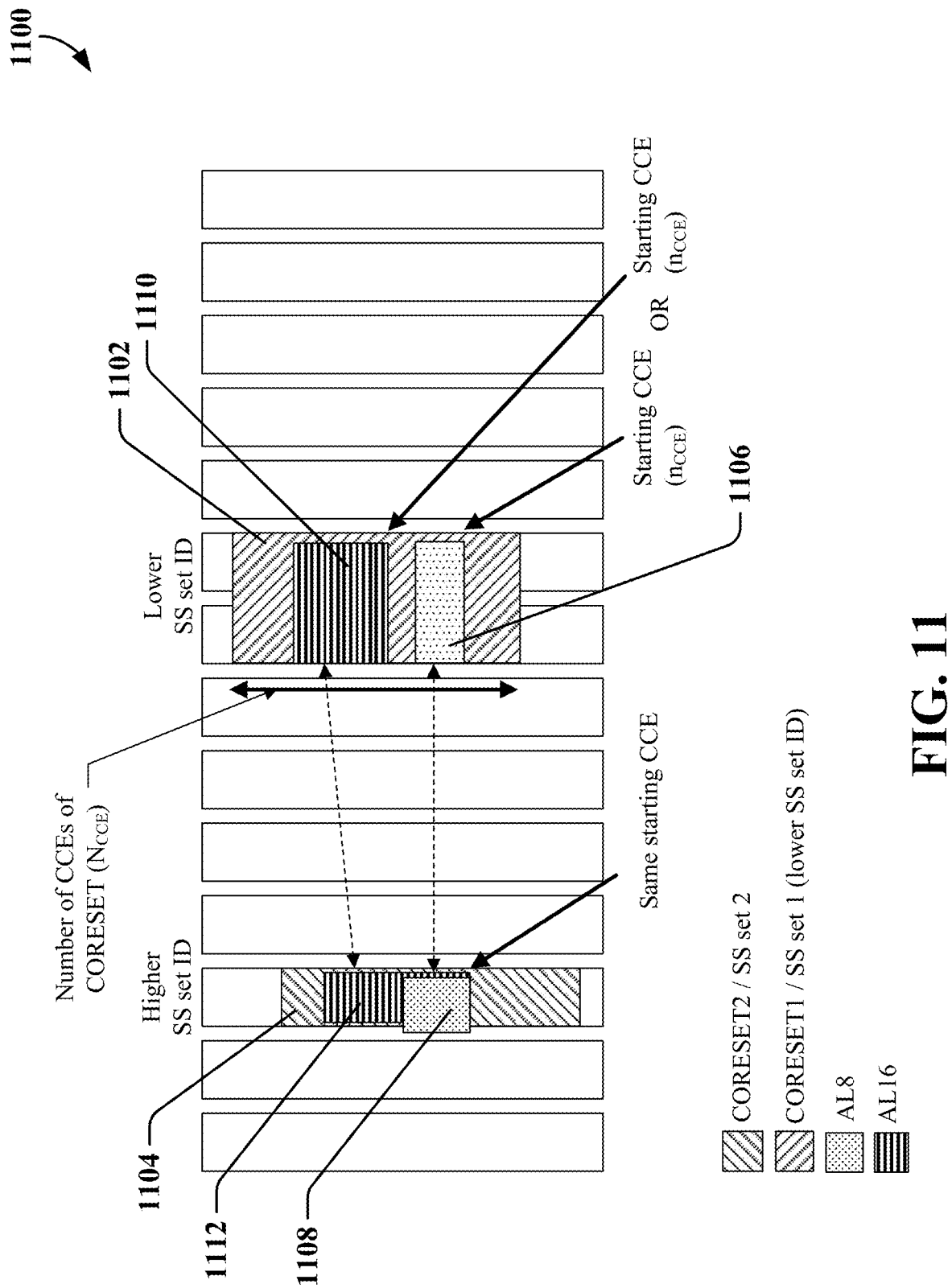
FIG. 11 is a diagram illustrating other examples of starting CCEs selected for identifying a physical uplink control channel (PUCCH) resource according to some aspects.

FIG. 11 illustrates an example 1100 where the second, third, and fourth example procedures may be used to identify a starting CCE to be used for Equation 1. The example 1100 illustrates linked PDCCH candidates for a scenario where a first CORESET (CORESET 1) 1102 is associated with a lower SS set ID than a second CORESET (CORESET 2) 1104. A first PDCCH candidate 1106 of the first CORESET 1102 is linked to a first PDCCH candidate 1108 of the second CORESET 1104. A second PDCCH candidate 1110 of the first CORESET 1102 is linked to a second PDCCH candidate 1112 of the second CORESET 1104. The first PDCCH candidates 1106 and 1108 have a lower aggregation level than the second PDCCH candidates 1110 and 1112. The first PDCCH candidate 1108 and the second PDCCH candidate 1112 have the same starting CCE, while the first PDCCH candidate 1106 and the second PDCCH candidate 1110 have different starting CCEs.

In the second example procedure, the UE uses the starting CCE associated with the higher aggregation level (e.g., AL16) PDCCH candidate in the first CORESET 1102 (associated with the lower SS set ID) to identify a PUCCH resource (e.g. for Equation 1). Thus, the starting CCE for the second PDCCH candidate 1110 may be used as the starting CCE ($N_{CCE}$) for Equation 1. In addition, the number of CCEs of the first CORESET 1102 may be used as the number of CCEs ($N_{CCE}$) for Equation 1. In some aspects, this procedure may be effectively used in implementations that do not use PDCCH repetition or linked SS sets, where AL16 is used as a reference for PDSCH rate matching.

In the third example procedure, the UE uses the starting CCE associated with the lower aggregation level (e.g., AL8) PDCCH candidate in the first CORESET 1102 (associated with the lower SS set ID) to identify a PUCCH resource (e.g. for Equation 1). Thus, the starting CCE ($n_{CCE}$) for the first PDCCH candidate 1106 may be used as the starting CCE for Equation 1. In addition, the number of CCEs of the first CORESET 1102 may be used as the number of CCEs ($N_{CCE}$) for Equation 1.

In the fourth example procedure, the UE uses the starting CCE associated with the PDCCH candidate with the higher starting CCE in the first CORESET 1102 (associated with the lower SS set ID) to identify a PUCCH resource (e.g. for Equation 1). In this case, the starting CCE for the second PDCCH candidate 1110 may be used as the starting CCE ($n_{CCE}$) for Equation 1. In addition, the number of CCEs of the first CORESET 1102 may be used as the number of CCEs ($N_{CCE}$) for Equation 1.

Figure 12:
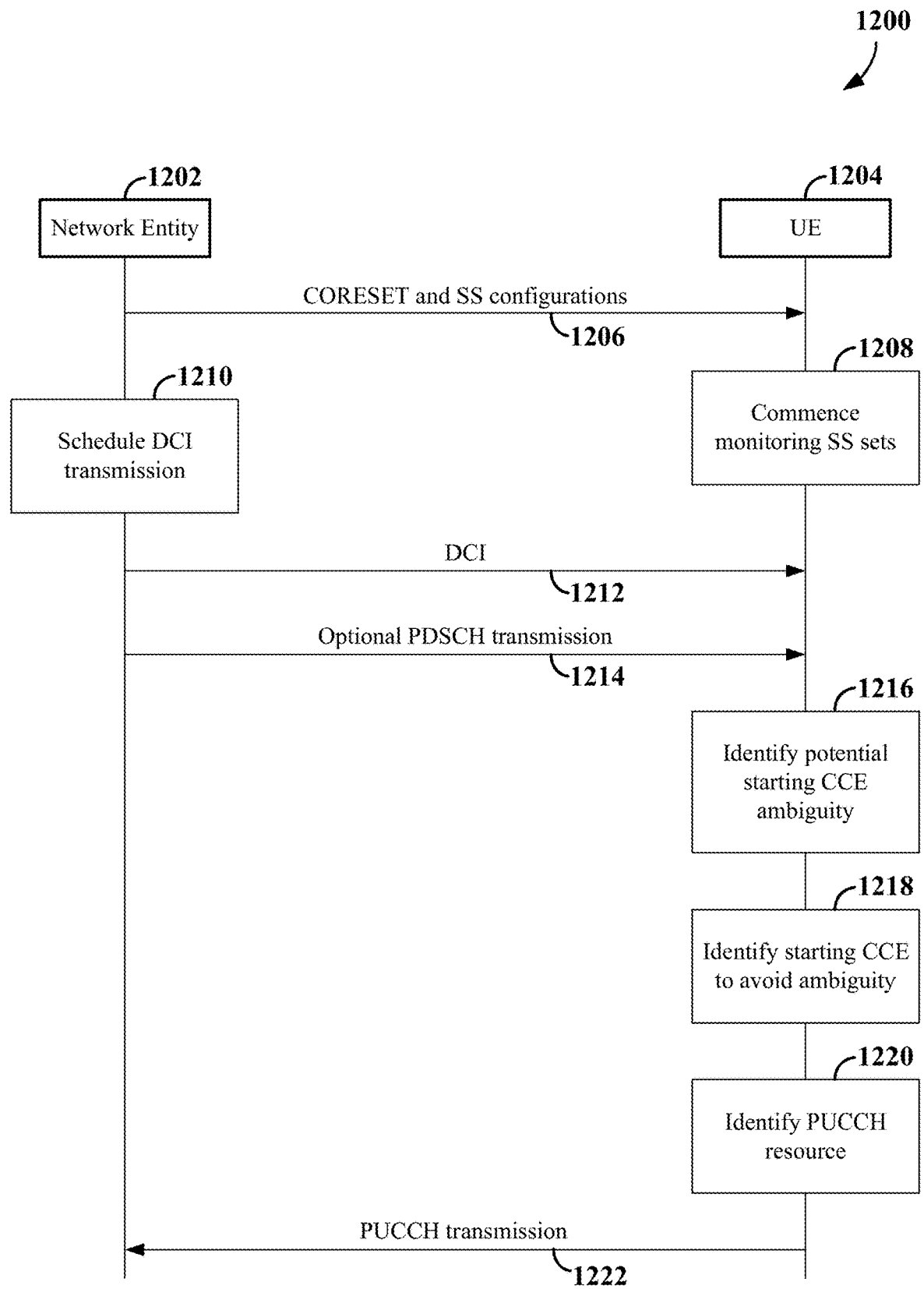
FIG. 12 is a signaling diagram illustrating an example of PUCCH resource identification-related signaling according to some aspects.

FIG. 12 is a signaling diagram 1200 illustrating an example of PUCCH resource identification-related signaling in a wireless communication system including a network entity (e.g., a base station) 1202 and a user equipment (UE) 1204. In some examples, the network entity 1202 may correspond to any of the network entities, base stations, or scheduling entities shown in any of FIGS. 1, 2, and 18. In some examples, the UE 1204 may correspond to any of the UEs or scheduled entities shown in any of FIGS. 1, 2, and 13.

At 1206 of FIG. 12, the network entity 1202 transmits (e.g., via RRC messaging) CORESET and SS configurations that the UE 1204 is to use for receiving information from the network entity 1202. For example, a CORESET configuration for the UE may specify the RBs and the number of symbols for each CORESET configured for the UE 1204. In addition, an SS configuration may specify, for each configured SS set, the associated CORESET, PDCCH MO information, PDCCH candidates, and so on.

At 1208, the UE 1204 repeatedly monitors the configured SS sets to determine whether the network entity 1202 has transmitted any messages to the UE 1204. As discussed herein, this may involve blind decoding for PDCCH candidates in a search space configured for the UE 1204.

At 1210, at some point in time, the network entity 1202 schedules a DCI transmission for the UE 1204. As discussed here, in some examples, this DCI may schedule a PDSCH transmission and an associated PUCCH transmission, or the DCI may simply schedule a PUCCH transmission for a HARQ-Ack. Accordingly, at 1212, the network entity 1202 transmits a DCI to the UE 1204 via one or more PDCCH candidates, where the DCI indicates the scheduled PDSCH transmission, if applicable, and/or includes a PRI for identifying a PUCCH resource for a HARQ-Ack. As discussed herein, the DCI may be sent using PDCCH repetition. Moreover, the network entity 1202 may transmit different PDCCH candidates with different aggregation levels on a given CORESET as discussed herein. At optional 1214, the network entity 1202 may transmit the PDSCH transmission to the UE 1204.

The UE 1204 may then attempt to decode the DCI (and, optionally, the PDSCH) and generate a HARQ-Ack to be sent to the network entity 1202 to indicate whether the UE 1204 successfully received the DCI and/or the PDSCH transmission. Thus, the UE 1204 will identify the PUCCH resource for sending the HARQ-Ack to the network entity 1202. For example, the UE 1204 may use Equation 1 which is based, in part, on a starting CCE parameter ($n_{CCE}$).

At 1216, the UE 1204 may identify a potential starting CCE ambiguity associated with PDCCH candidates decoded by the UE 1204. For example, as discussed herein, if two PDCCH candidates that have different aggregation levels are received on the same CORESET and have the same starting CC, and if these PDCCH candidates are replicated on another CORESET where the two PDCCH candidates have different starting CCs, an ambiguity may arise as to which starting CC is to be used for calculating the PUCCH resource for the HARQ-Ack (e.g., using Equation 1).

At 1218, the UE 1204 uses one of the example procedures described herein in conjunction with FIGS. 10 and 11 to identify the starting CCE to be used for calculating the PUCCH resource for the HARQ-Ack. For example, the UE 1204 may be configured to use the first example procedure, the second example procedure, the third example procedure, or the fourth example procedure.

At 1220, the UE 1204 identifies the PUCCH resource for the HARQ-Ack based on the starting CCE identified at 1216. For example, the UE may use Equation 1 to identify a PUCCH resource index ($r_{PUCCH}$) of a PUCCH resource set ($R_{PUCCH}$).

At 1222, the UE 1204 transmits the PUCCH transmission on the PUCCH resource identified at 1220. For example, the UE 1204 may use a resource indicated by the PUCCH resource index to transmit the HARQ-Ack.

Figure 13:
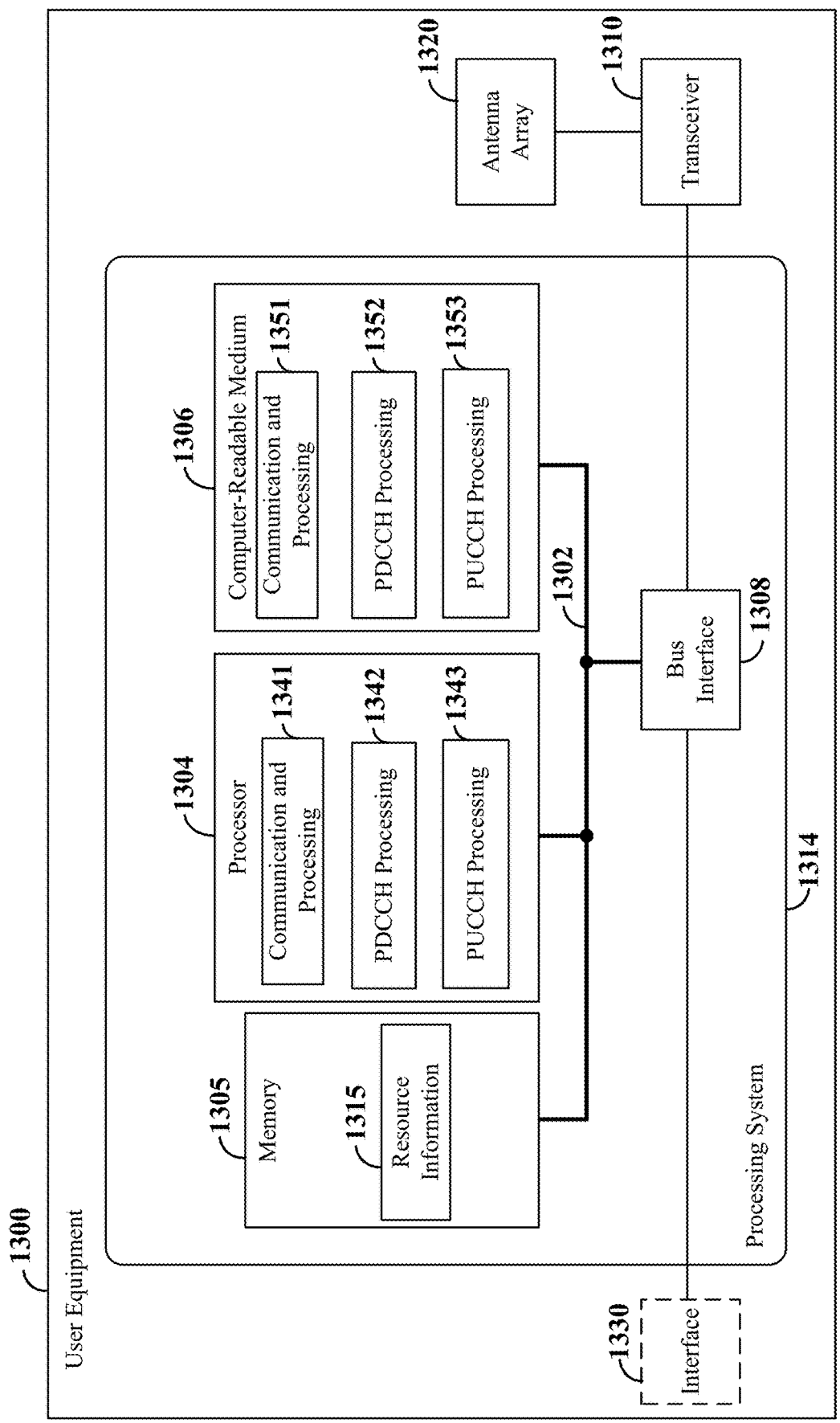
FIG. 13 is a block diagram illustrating an example of a hardware implementation for a user equipment employing a processing system according to some aspects.

FIG. 13 is a block diagram illustrating an example of a hardware implementation for a UE 1300 employing a processing system 1314. For example, the UE 1300 may be a device configured to wirelessly communicate with a network entity, as discussed in any one or more of FIGS. 1-12. In some implementations, the UE 1300 may correspond to any of the UEs or scheduled entities shown in any of FIGS. 1, 2, and 12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components out-side of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the UE may include two or more transceivers 1310. The interface 1330 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store resource information 1315 (e.g., PUCCH resource-related information) used by the processor 1304 in cooperation with the transceiver 1310 for transmitting and/or receiving messages.

One or more processors 1304 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14-17). In some aspects of the disclosure, the processor 1304, as utilized in the UE 1300, may include circuitry configured for various functions.

The processor 1304 may include communication and processing circuitry 1341. The communication and processing circuitry 1341 may be configured to communicate with a network entity, such as a gNB. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves receiving information, the communication and processing circuitry 1341 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for transmitting. In some examples, the communication and processing circuitry 1341 may include functionality for a means for encoding.

The processor 1304 may include PDCCH processing circuitry 1342 configured to perform PDCCH processing-related operations as discussed herein (e.g., one or more of the operations described in conjunction with FIGS. 4-12). The PDCCH processing circuitry 1342 may be configured to execute PDCCH processing software 1352 included on the computer-readable medium 1306 to implement one or more functions described herein.

The PDCCH processing circuitry 1342 may include functionality for a means for receiving a PDCCH candidate (e.g., as discussed above in conjunction with 1212 of FIG. 12). For example, the PDCCH processing circuitry 1342 together with the communication and processing circuitry 1341 and the transceiver 1310 may monitor a search space for PDCCH candidates and attempt to decode DCI carried by the PDCCH candidate.

The processor 1304 may include PUCCH processing circuitry 1343 configured to perform PUCCH processing-related operations as discussed herein (e.g., one or more of the operations described in conjunction with FIGS. 4-12). The PUCCH processing circuitry 1343 may be configured to execute PUCCH processing software 1353 included on the computer-readable medium 1306 to implement one or more functions described herein.

The PUCCH processing circuitry 1343 may include functionality for a means for identifying a PUCCH resource (e.g., as discussed above in conjunction with any of FIGS. 8-12). For example, the PUCCH processing circuitry 1343 may identify a PUCCH resource (e.g., using Equation 1) for a HARQ-Ack transmission.

The PUCCH processing circuitry 1343 may include functionality for a means for transmitting PUCCH information (e.g., as discussed above in conjunction with 1216-1222 of FIG. 12). For example, the PUCCH processing circuitry 1343 may cooperate with the communication and processing circuitry 1341 and the transceiver 1310 to transmit a HARQ-Ack on an identified PUCCH resource.

Figure 14:
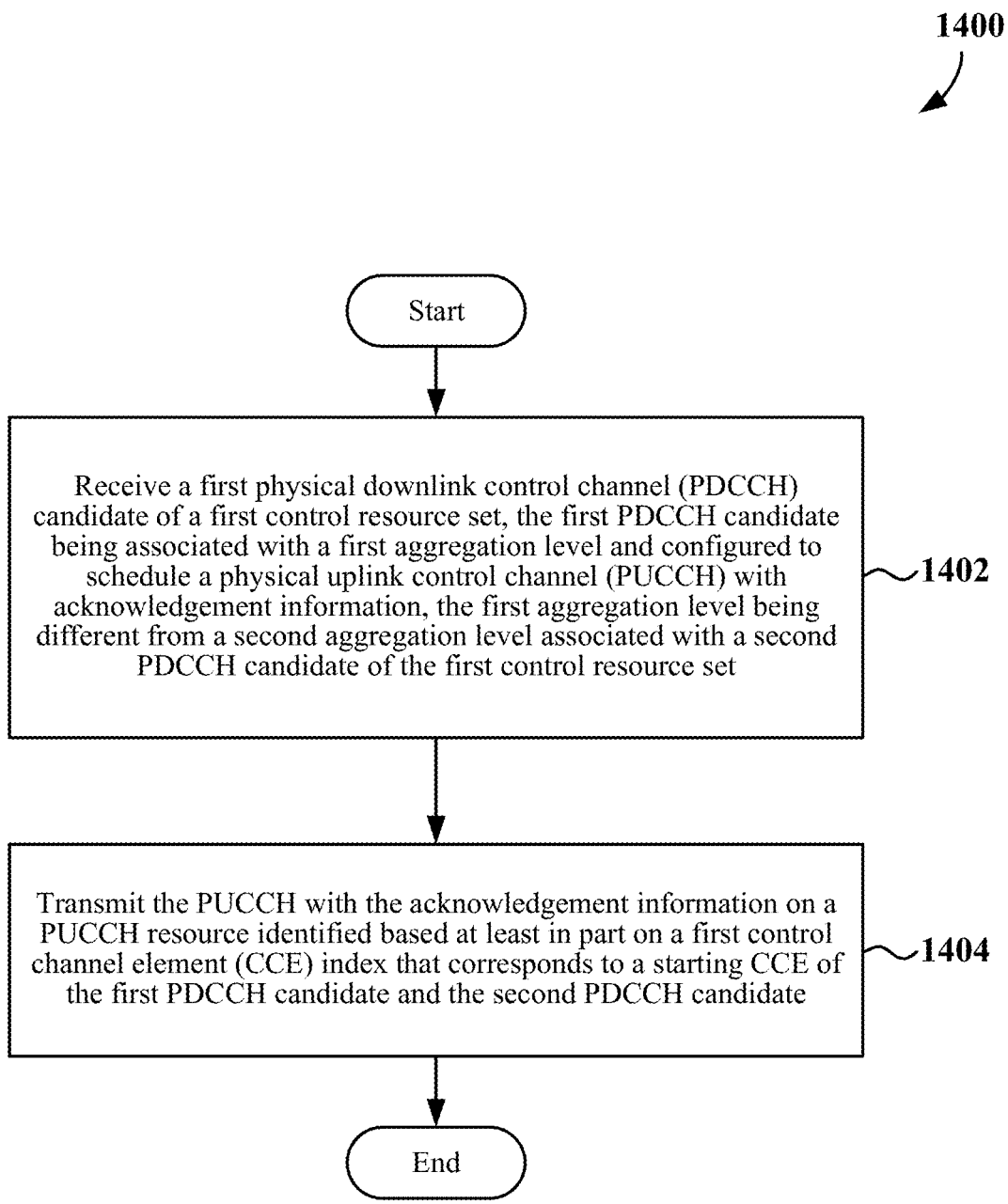
FIG. 14 is a flow chart of a first example method for transmitting physical uplink control channel (PUCCH) information according to some aspects.

FIG. 14 is a flow chart illustrating an example method 1400 for wireless communication according to some aspects of the disclosure. As described herein, some or all illustrated features may be omitted in a particular implementation within the scope of the present disclosure, and some illustrated features may not be required for implementation of all examples. In some examples, the method 1400 may be carried out by the UE 1300 illustrated in FIG. 13. In some examples, the method 1400 may be carried out by any suitable apparatus or means for carrying out the functions or algorithm described below.

At block 1402, a user equipment may receive a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set. For example, the PDCCH processing circuitry 1342 together with the communication and processing circuitry 1341 and the transceiver 1310, shown and described above in connection with FIG. 13, may provide a means to receive a first physical downlink control channel (PDCCH) candidate of a first control resource set.

At block 1404, the user equipment may transmit the PUCCH with the acknowledgement information on a PUCCH resource identified based at least in part on a first control channel element (CCE) index that corresponds to a starting CCE of the first PDCCH candidate and the second PDCCH candidate. For example, the PUCCH processing circuitry 1343 together with the communication and processing circuitry 1341 and the transceiver 1310, shown and described above in connection with FIG. 13, may provide a means to transmit the PUCCH with the acknowledgement information on a PUCCH resource identified based at least in part on a first control channel element (CCE) index that corresponds to a starting CCE of the first PDCCH candidate and the second PDCCH candidate.

In some examples, the user equipment may identify the PUCCH resource based at least in part on the first CCE index responsive to a determination that the first PDCCH candidate and the second PDCCH candidate start at a same location (i.e., the same location) within the first control resource set.

In some examples, the user equipment may identify the PUCCH resource based at least in part on the first CCE index responsive to a determination that the first control resource set is a non-interleaved control resource set that has a single orthogonal frequency division multiplexing (OFDM) symbol.

In some examples, the user equipment may identify the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

In some examples, the user equipment may identify the PUCCH resource based at least in part on the first CCE index responsive to a determination that a PUCCH resource set that includes the PUCCH resource includes more than eight PUCCH resources.

In some examples, a second control resource set carries a third PDCCH candidate that is a repeat of the first PDCCH candidate. In some examples, the second control resource set carries a fourth PDCCH candidate that is a repeat of the second PDCCH candidate. In some examples, the user equipment may identify the PUCCH resource based at least in part on the first CCE index responsive to a determination that a first starting CCE of the third PDCCH candidate is different from a second starting CCE of the fourth PDCCH candidate.

In some examples, the user equipment may identify the PUCCH resource based at least in part on the first CCE index responsive to a determination that the first PDCCH candidate and the second PDCCH candidate start at a same location within the first control resource set, the first control resource set is a non-interleaved control resource set that has a single orthogonal frequency division multiplex (OFDM) symbol, the first PDCCH candidate and the second PDCCH candidate are in a first search space set that is linked to a second search space set for PDCCH repetition (where the first search space set is assigned a first search space set index that is higher than a second search space set index assigned to the second search space set), a PUCCH resource set that includes the PUCCH resource includes more than eight PUCCH resources, and a first starting CCE of a third PDCCH candidate that is a duplicate of the first PDCCH candidate is different from a second starting CCE of a fourth PDCCH candidate that is a duplicate of the second PDCCH candidate.

In some examples, the first aggregation level corresponds to eight CCEs. In some examples, the second aggregation level corresponds to sixteen CCEs.

In some examples, the first PDCCH candidate comprises a PUCCH resource indicator. In some examples, the first control resource set comprises a defined number of control channel elements. In some examples, the user equipment may identify the PUCCH resource based at least in part on the first CCE index, the PUCCH resource indicator, and the defined number of control channel elements.

In some examples, the first PDCCH candidate comprises first downlink control information (DCI) that schedules a first physical downlink shared channel (PDSCH) transmission. In some examples, the second PDCCH candidate comprises second DCI that schedules a second PDSCH transmission.

Figure 15:
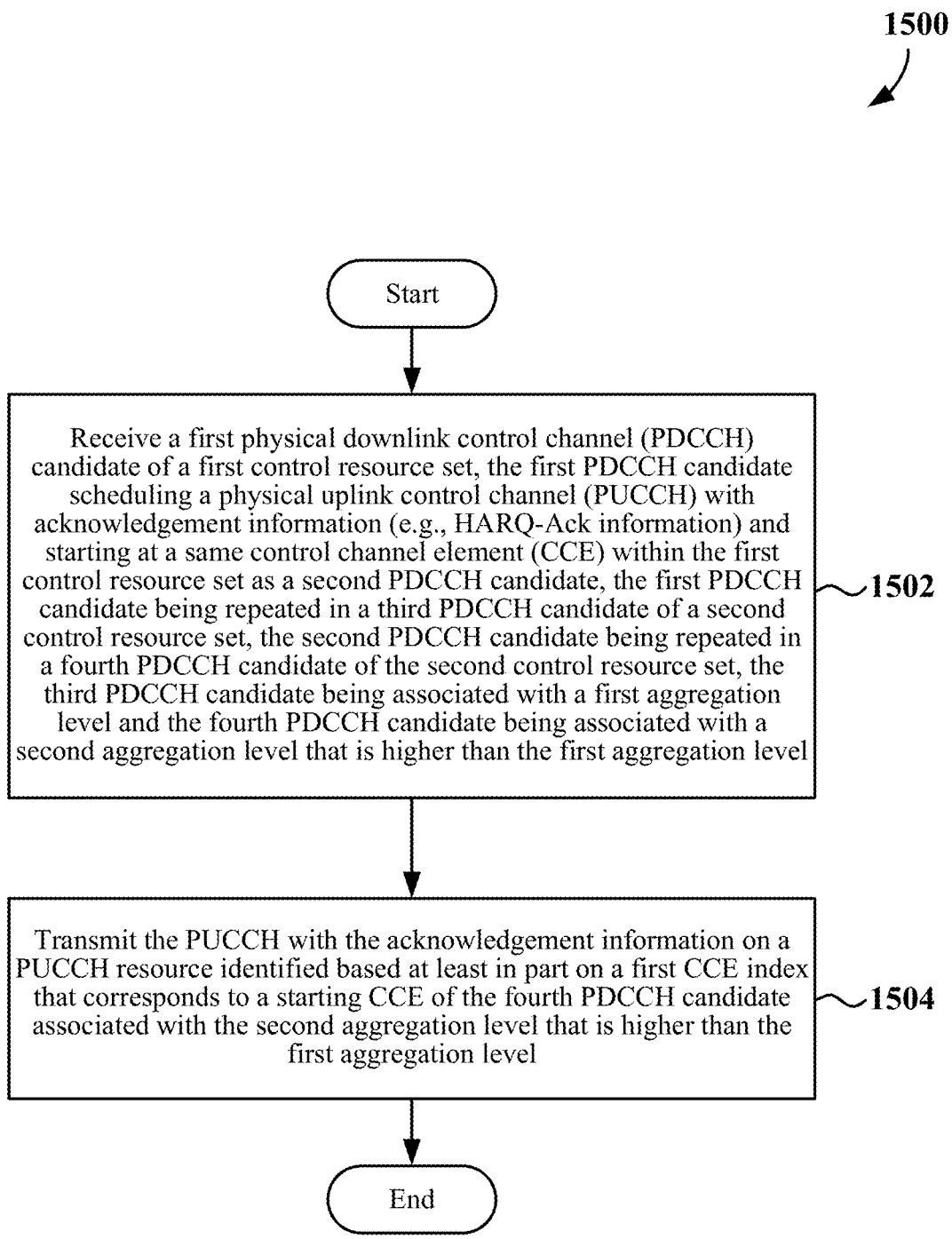
FIG. 15 is a flow chart of a second example method for transmitting physical uplink control channel (PUCCH) information according to some aspects.

FIG. 15 is a flow chart illustrating an example method 1500 for wireless communication according to some aspects of the disclosure. As described herein, some or all illustrated features may be omitted in a particular implementation within the scope of the present disclosure, and some illustrated features may not be required for implementation of all examples. In some examples, the method 1500 may be carried out by the UE 1300 illustrated in FIG. 13. In some examples, the method 1500 may be carried out by any suitable apparatus or means for carrying out the functions or algorithm described below.

At block 1502, a user equipment may receive a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. For example, the PDCCH processing circuitry 1342 together with the communication and processing circuitry 1341 and the transceiver 1310, shown and described above in connection with FIG. 13, may provide a means to receive a first physical downlink control channel (PDCCH) candidate of a first control resource set.

At block 1504, the user equipment may transmit the PUCCH with the acknowledgement information on a PUCCH resource identified based at least in part on a first CCE index that corresponds to a starting CCE of the fourth PDCCH candidate associated with the second aggregation level that is higher than the first aggregation level. For example, the PUCCH processing circuitry 1343 together with the communication and processing circuitry 1341 and the transceiver 1310, shown and described above in connection with FIG. 13, may provide a means to transmit the PUCCH with the acknowledgement information on a PUCCH resource identified based at least in part on a first CCE index that corresponds to a starting CCE of the fourth PDCCH candidate associated with the second aggregation level that is higher than the first aggregation level.

In some examples, the user equipment may identify the PUCCH resource based at least in part on the first CCE index responsive to a determination that the first PDCCH candidate and the second PDCCH candidate start at a same location within the first control resource set.

In some examples, the user equipment may identify the PUCCH resource based at least in part on the first CCE index responsive to a determination that the first control resource set is a non-interleaved control resource set that has a single orthogonal frequency division multiplexing (OFDM) symbol.

In some examples, the user equipment may identify the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

In some examples, the user equipment may identify the PUCCH resource based at least in part on the first CCE index responsive to a determination that a PUCCH resource set that includes the PUCCH resource includes more than eight PUCCH resources.

In some examples, a second control resource set carries a third PDCCH candidate that is a repeat of the first PDCCH candidate. In some examples, the second control resource set carries a fourth PDCCH candidate that is a repeat of the second PDCCH candidate. In some examples, the user equipment may identify the PUCCH resource based at least in part on the first CCE index responsive to a determination that a starting CCE of the third PDCCH candidate is different from the starting CCE of the fourth PDCCH candidate.

In some examples, the user equipment may identify the PUCCH resource based at least in part on the first CCE index responsive to a determination that the first PDCCH candidate and the second PDCCH candidate start at a same location within the first control resource set, the first control resource set is a non-interleaved control resource set that has a single orthogonal frequency division multiplex (OFDM) symbol, the first PDCCH candidate and the second PDCCH candidate are in a first search space set that is linked to a second search space set for PDCCH repetition (where the first search space set is assigned a first search space set index that is higher than a second search space set index assigned to the second search space set), a PUCCH resource set that includes the PUCCH resource includes more than eight PUCCH resources, and a starting CCE of the third PDCCH candidate is different from the starting CCE of the fourth PDCCH candidate.

In some examples, the first aggregation level corresponds to eight CCEs. In some examples, the second aggregation level corresponds to sixteen CCEs.

In some examples, the first PDCCH candidate comprises a PUCCH resource indicator. In some examples, the first control resource set comprises a defined number of control channel elements. In some examples, the user equipment may identify the PUCCH resource based at least in part on the first CCE index, the PUCCH resource indicator, and the defined number of control channel elements.

In some examples, the first PDCCH candidate comprises first downlink control information (DCI) that schedules a first physical downlink shared channel (PDSCH) transmission. In some examples, the second PDCCH candidate comprises second DCI that schedules a second PDSCH transmission.

Figure 16:
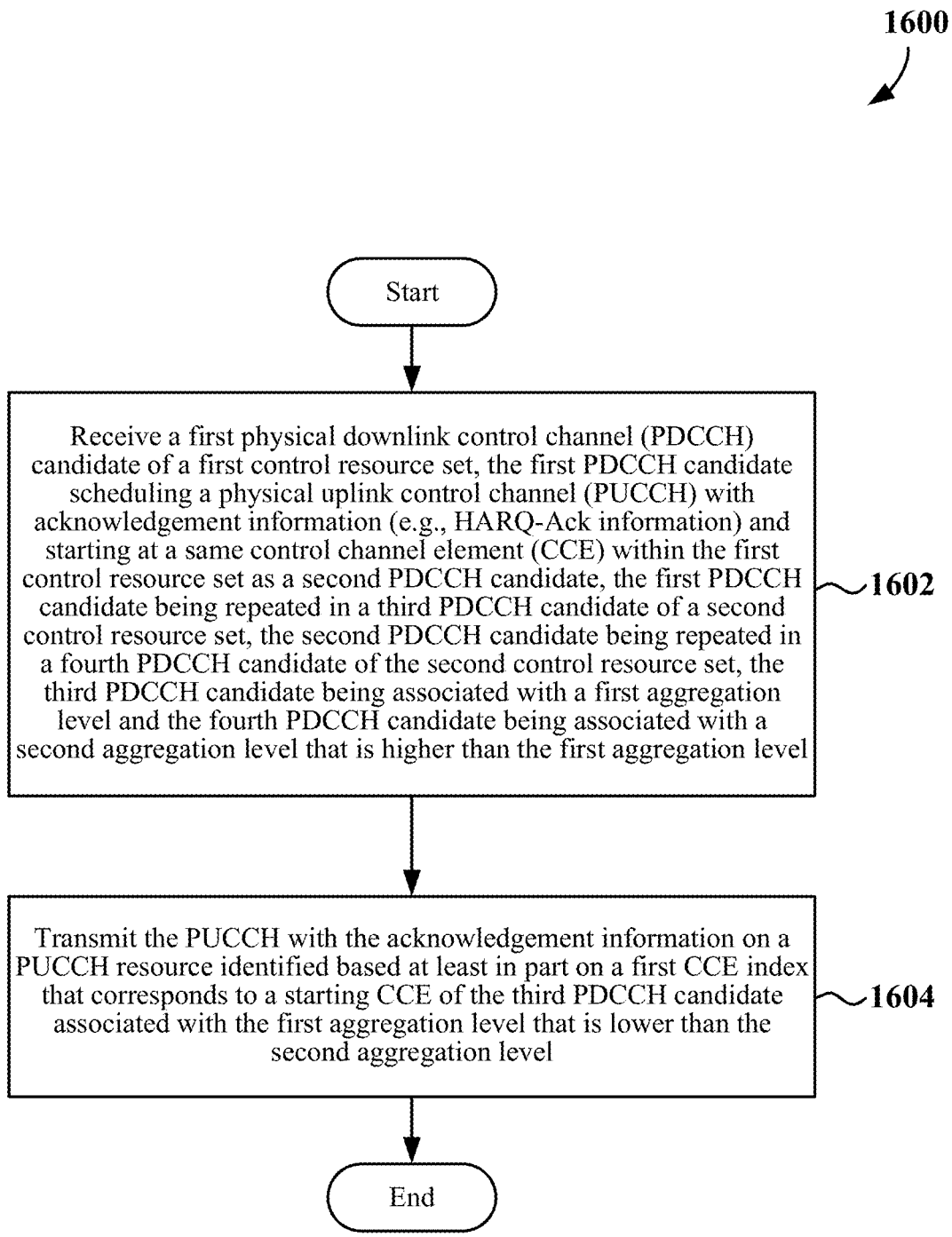
FIG. 16 is a flow chart of a third example method for transmitting physical uplink control channel (PUCCH) information according to some aspects.

FIG. 16 is a flow chart illustrating an example method 1600 for wireless communication according to some aspects of the disclosure. As described herein, some or all illustrated features may be omitted in a particular implementation within the scope of the present disclosure, and some illustrated features may not be required for implementation of all examples. In some examples, the method 1600 may be carried out by the UE 1300 illustrated in FIG. 13. In some examples, the method 1600 may be carried out by any suitable apparatus or means for carrying out the functions or algorithm described below.

At block 1602, a user equipment may receive a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level. For example, the PDCCH processing circuitry 1342 together with the communication and processing circuitry 1341 and the transceiver 1310, shown and described above in connection with FIG. 13, may provide a means to receive a first physical downlink control channel (PDCCH) candidate of a first control resource set.

At block 1604, the user equipment may transmit the PUCCH with the acknowledgement information on a PUCCH resource identified based at least in part on a first CCE index that corresponds to a starting CCE of the third PDCCH candidate associated with the first aggregation level that is lower than the second aggregation level. For example, the PUCCH processing circuitry 1343 together with the communication and processing circuitry 1341 and the transceiver 1310, shown and described above in connection with FIG. 13, may provide a means to transmit the PUCCH with the acknowledgement information on a PUCCH resource identified based at least in part on a first CCE index that corresponds to a starting CCE of the third PDCCH candidate associated with the first aggregation level that is lower than the second aggregation level.

In some examples, the user equipment may identify the PUCCH resource based at least in part on the first CCE index responsive to a determination that the first PDCCH candidate and the second PDCCH candidate start at a same location within the first control resource set.

In some examples, the user equipment may identify the PUCCH resource based at least in part on the first CCE index responsive to a determination that the first control resource set is a non-interleaved control resource set that has a single orthogonal frequency division multiplexing (OFDM) symbol.

In some examples, the user equipment may identify the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

In some examples, the user equipment may identify the PUCCH resource based at least in part on the first CCE index responsive to a determination that a PUCCH resource set that includes the PUCCH resource includes more than eight PUCCH resources.

In some examples, the user equipment identifies the PUCCH resource based at least in part on the first CCE index responsive to a determination that the starting CCE of the third PDCCH candidate is different from a starting CCE of the fourth PDCCH candidate.

In some examples, the user equipment may identify the PUCCH resource based at least in part on the first CCE index responsive to a determination that the first PDCCH candidate and the second PDCCH candidate start at a same location within the first control resource set, the first control resource set is a non-interleaved control resource set that has a single orthogonal frequency division multiplex (OFDM) symbol, the first PDCCH candidate and the second PDCCH candidate are in a first search space set that is linked to a second search space set for PDCCH repetition (where the first search space set is assigned a first search space set index that is higher than a second search space set index assigned to the second search space set), a PUCCH resource set that includes the PUCCH resource includes more than eight PUCCH resources, and the starting CCE of the third PDCCH candidate is different from a starting CCE of the fourth PDCCH candidate.

In some examples, the first aggregation level corresponds to eight CCEs. In some examples, the second aggregation level corresponds to sixteen CCEs.

In some examples, the first PDCCH candidate comprises a PUCCH resource indicator. In some examples, the first control resource set comprises a defined number of control channel elements. In some examples, the user equipment may identify the PUCCH resource based at least in part on the first CCE index, the PUCCH resource indicator, and the defined number of control channel elements.

In some examples, the first PDCCH candidate comprises first downlink control information (DCI) that schedules a first physical downlink shared channel (PDSCH) transmission. In some examples, the second PDCCH candidate comprises second DCI that schedules a second PDSCH transmission.

Figure 17:
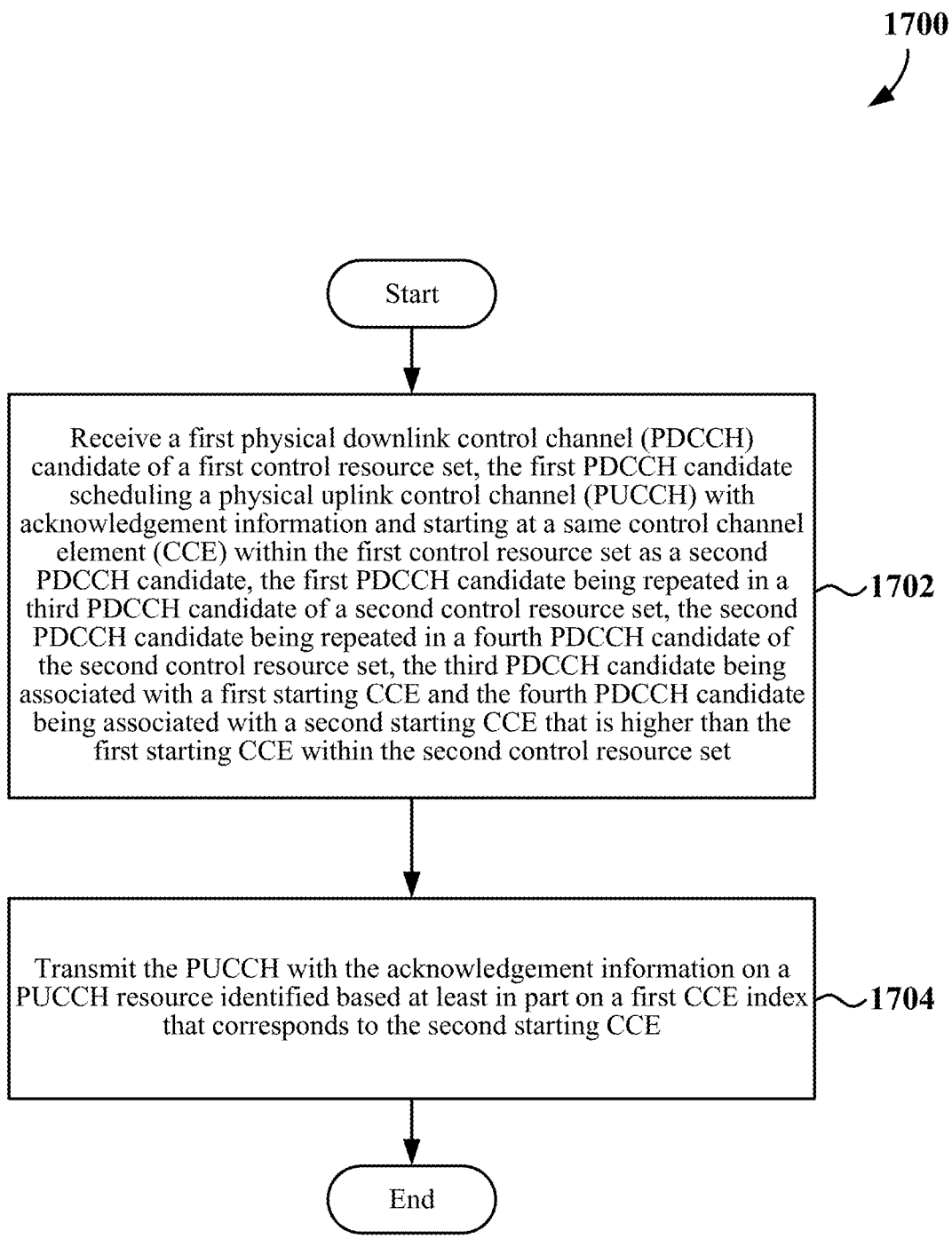
FIG. 17 is a flow chart of a fourth example method for transmitting physical uplink control channel (PUCCH) information according to some aspects.

FIG. 17 is a flow chart illustrating an example method 1700 for wireless communication according to some aspects of the disclosure. As described herein, some or all illustrated features may be omitted in a particular implementation within the scope of the present disclosure, and some illustrated features may not be required for implementation of all examples. In some examples, the method 1700 may be carried out by the UE 1300 illustrated in FIG. 13. In some examples, the method 1700 may be carried out by any suitable apparatus or means for carrying out the functions or algorithm described below.

At block 1702, a user equipment may receive a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set. For example, the PDCCH processing circuitry 1342 together with the communication and processing circuitry 1341 and the transceiver 1310, shown and described above in connection with FIG. 13, may provide a means to receive a first physical downlink control channel (PDCCH) candidate of a first control resource set.

At block 1704, the user equipment may transmit the PUCCH with the acknowledgement information on a PUCCH resource identified based at least in part on a first CCE index that corresponds to the second starting CCE. For example, the PUCCH processing circuitry 1343 together with the communication and processing circuitry 1341 and the transceiver 1310, shown and described above in connection with FIG. 13, may provide a means to transmit the PUCCH with the acknowledgement information on a PUCCH resource identified based at least in part on a first CCE index that corresponds to the second starting CCE.

In some examples, the user equipment may identify the PUCCH resource based at least in part on the first CCE index responsive to a determination that the first PDCCH candidate and the second PDCCH candidate start at a same location within the first control resource set.

In some examples, the user equipment may identify the PUCCH resource based at least in part on the first CCE index responsive to a determination that the first control resource set is a non-interleaved control resource set that has a single orthogonal frequency division multiplexing (OFDM) symbol.

In some examples, the user equipment may identify the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

In some examples, the user equipment may identify the PUCCH resource based at least in part on the first CCE index responsive to a determination that a PUCCH resource set that includes the PUCCH resource includes more than eight PUCCH resources.

In some examples, the user equipment may identify the PUCCH resource based at least in part on the first CCE index responsive to a determination that the first starting CCE is different from the second starting CCE.

In some examples, the user equipment may identify the PUCCH resource based at least in part on the first CCE index responsive to a determination that the first PDCCH candidate and the second PDCCH candidate start at a same location within the first control resource set, the first control resource set is a non-interleaved control resource set that has a single orthogonal frequency division multiplex (OFDM) symbol, the first PDCCH candidate and the second PDCCH candidate are in a first search space set that is linked to a second search space set for PDCCH repetition (where the first search space set is assigned a first search space set index that is higher than a second search space set index assigned to the second search space set), a PUCCH resource set that includes the PUCCH resource includes more than eight PUCCH resources, and the first starting CCE is different from the second starting CCE.

In some examples, the third PDCCH candidate is associated with a first aggregation level. In some examples, the fourth PDCCH candidate is associated with a second aggregation level that is different from the first aggregation level.

In some examples, the first PDCCH candidate comprises a PUCCH resource indicator. In some examples, the first control resource set comprises a defined number of control channel elements. In some examples, the user equipment may identify the PUCCH resource based at least in part on the first CCE index, the PUCCH resource indicator, and the defined number of control channel elements.

In some examples, the first PDCCH candidate comprises first downlink control information (DCI) that schedules a first physical downlink shared channel (PDSCH) transmission. In some examples, the second PDCCH candidate comprises second DCI that schedules a second PDSCH transmission.

In one configuration, the UE 1300 includes means for receiving a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set, and means for transmitting the PUCCH with the acknowledgement information on a PUCCH resource identified based at least in part on a first control channel element (CCE) index that corresponds to a starting CCE of the first PDCCH candidate and the second PDCCH candidate. In one configuration, the UE 1300 includes means for receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level, and means for transmitting the PUCCH with the acknowledgement information on a PUCCH resource identified based at least in part on a first CCE index that corresponds to a starting CCE of the fourth PDCCH candidate associated with the second aggregation level that is higher than the first aggregation level. In one configuration, the UE 1300 includes means for receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level, and means for transmitting the PUCCH with the acknowledgement information on a PUCCH resource identified based at least in part on a first CCE index that corresponds to a starting CCE of the third PDCCH candidate associated with the first aggregation level that is lower than the second aggregation level. In one configuration, the UE 1300 includes means for receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set, and means for transmitting the PUCCH with the acknowledgement information on a PUCCH resource identified based at least in part on a first CCE index that corresponds to the second starting CCE. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 12, and 13, and utilizing, for example, the methods and/or algorithms described herein in relation to FIGS. 14-17.

The methods shown in FIGS. 14-17 may include additional aspects, such as any single aspect or any combination of aspects described below and/or in connection with one or more other processes described elsewhere herein.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 18:
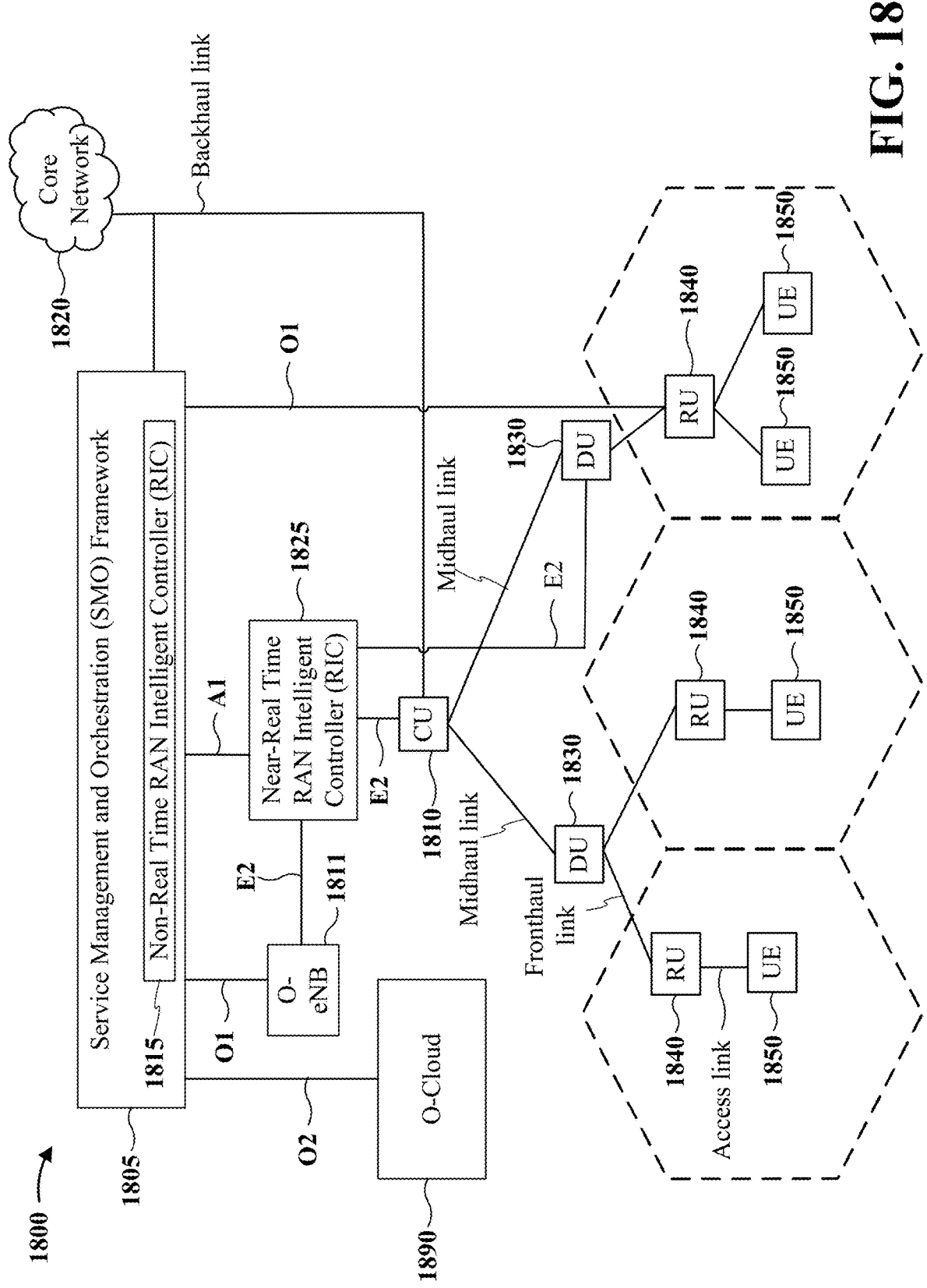
FIG. 18 is a diagram providing a high-level illustration of one example of a configuration of a disaggregated base station according to some aspects.

FIG. 18 shows a diagram illustrating an example disaggregated base station 1800 architecture. The disaggregated base station 1800 architecture may include one or more central units (CUs) 1810 that can communicate directly with a core network 1820 via a backhaul link, or indirectly with the core network 1820 through one or more disaggregated base station units (such as a Near-Real Time (Near-RT) RAN Intelligent Controller (RIC) 1825 via an E2 link, or a Non-Real Time (Non-RT) RIC 1815 associated with a Service Management and Orchestration (SMO) Framework 1805, or both). A CU 1810 may communicate with one or more distributed units (DUs) 1830 via respective midhaul links, such as an F1 interface. The DUs 1830 may communicate with one or more radio units (RUs) 1840 via respective fronthaul links. The RUs 1840 may communicate with respective UEs 1850 via one or more radio frequency (RF) access links. In some implementations, the UE 1850 may be simultaneously served by multiple RUs 1840.

Each of the units, i.e., the CUs 1810, the DUs 1830, the RUs 1840, as well as the Near-RT RICs 1825, the Non-RT RICs 1815 and the SMO Framework 1805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1810. The CU 1810 may be configured to handle user plane functionality (i.e., Central Unit—User Plane (CU-UP)), control plane functionality (i.e., Central Unit—Control Plane (CU-CP)), or a combination thereof. In some implementations, the CU 1810 can be logically split into one or more CU-UP units and one or more CU-CP units. The CU-UP unit can communicate bidirectionally with the CU-CP unit via an interface, such as the E1 interface when implemented in an O-RAN configuration. The CU 1810 can be implemented to communicate with the distributed unit (DU) 1830, as necessary, for network control and signaling.

The DU 1830 may correspond to a logical unit that includes one or more base station functions to control the operation of one or more RUs 1840. In some aspects, the DU 1830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 1830 may further host one or more low PHY layers. Each layer (or module) can be implemented with an interface configured to communicate signals with other layers (and modules) hosted by the DU 1830, or with the control functions hosted by the CU 1810.

Lower-layer functionality can be implemented by one or more RUs 1840. In some deployments, an RU 1840, controlled by a DU 1830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1840 can be implemented to handle over the air (OTA) communication with one or more UEs 1850. In some implementations, real-time and non-real-time aspects of control and user plane communication with the RU(s) 1840 can be controlled by the corresponding DU 1830. In some scenarios, this configuration can enable the DU(s) 1830 and the CU 1810 to be implemented in a cloud-based RAN architecture, such as a vRAN architecture.

The SMO Framework 1805 may be configured to support RAN deployment and provisioning of non-virtualized and virtualized network elements. For non-virtualized network elements, the SMO Framework 1805 may be configured to support the deployment of dedicated physical resources for RAN coverage requirements which may be managed via an operations and maintenance interface (such as an O1 interface). For virtualized network elements, the SMO Framework 1805 may be configured to interact with a cloud computing platform (such as an open cloud (O-Cloud) 1890) to perform network element life cycle management (such as to instantiate virtualized network elements) via a cloud computing platform interface (such as an O2 interface). Such virtualized network elements can include, but are not limited to, CUs 1810, DUs 1830, RUs 1840 and Near-RT RICs 1825. In some implementations, the SMO Framework 1805 can communicate with a hardware aspect of a 4G RAN, such as an open eNB (O-eNB) 1811, via an O1 interface. Additionally, in some implementations, the SMO Framework 1805 can communicate directly with one or more RUs 1840 via an O1 interface. The SMO Framework 1805 also may include a Non-RT RIC 1815 configured to support functionality of the SMO Framework 1805.

The Non-RT RIC 1815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1825. The Non-RT RIC 1815 may be coupled to or communicate with (such as via an A1 interface) the Near-RT RIC 1825. The Near-RT RIC 1825 may be configured to include a logical function that enables near-real-time control and optimization of RAN elements and resources via data collection and actions over an interface (such as via an E2 interface) connecting one or more CUs 1810, one or more DUs 1830, or both, as well as an O-eNB, with the Near-RT RIC 1825.

In some implementations, to generate AI/ML models to be deployed in the Near-RT RIC 1825, the Non-RT RIC 1815 may receive parameters or external enrichment information from external servers. Such information may be utilized by the Near-RT RIC 1825 and may be received at the SMO Framework 1805 or the Non-RT RIC 1815 from non-network data sources or from network functions. In some examples, the Non-RT RIC 1815 or the Near-RT RIC 1825 may be configured to tune RAN behavior or performance. For example, the Non-RT RIC 1815 may monitor long-term trends and patterns for performance and employ AI/ML models to perform corrective actions through the SMO Framework 1805 (such as reconfiguration via O1) or via creation of RAN management policies (such as A1 policies).

The following provides an overview of several aspects of the present disclosure.

Aspect 1: A method for wireless communication at a user equipment, the method comprising: receiving a first physical downlink control channel (PDCCH) candidate of a first control resource set, the first PDCCH candidate being associated with a first aggregation level and configured to schedule a physical uplink control channel (PUCCH) with acknowledgement information, the first aggregation level being different from a second aggregation level associated with a second PDCCH candidate of the first control resource set; and transmitting the PUCCH with the acknowledgement information on a PUCCH resource identified based at least in part on a first control channel element (CCE) index that corresponds to a starting CCE of the first PDCCH candidate and the second PDCCH candidate.

Aspect 2: The method of aspect 1, further comprising: identifying the PUCCH resource based at least in part on the first CCE index responsive to a determination that the first PDCCH candidate and the second PDCCH candidate start at a same location within the first control resource set.

Aspect 3: The method of aspect 1 or 2, further comprising: identifying the PUCCH resource based at least in part on the first CCE index responsive to a determination that the first control resource set is a non-interleaved control resource set that has a single orthogonal frequency division multiplexing (OFDM) symbol.

Aspect 4: The method of any of aspects 1 through 3, further comprising: identifying the PUCCH resource based at least in part on the first CCE index responsive to a determination that the first PDCCH candidate and the second PDCCH candidate are in a first search space set that is linked to a second search space set for PDCCH repetition.

Aspect 5: The method of any of aspects 1 through 4, further comprising: identifying the PUCCH resource based at least in part on the first CCE index responsive to a determination that a PUCCH resource set that includes the PUCCH resource includes more than eight PUCCH resources.

Aspect 6: The method of any of aspects 1 through 5, wherein: a second control resource set carries a third PDCCH candidate that is a repeat of the first PDCCH candidate; the second control resource set carries a fourth PDCCH candidate that is a repeat of the second PDCCH candidate; and the method further comprises identifying the PUCCH resource based at least in part on the first CCE index responsive to a determination that a first starting CCE of the third PDCCH candidate is different from a second starting CCE of the fourth PDCCH candidate.

Aspect 7: The method of aspect 1, further comprising identifying the PUCCH resource based at least in part on the first CCE index responsive to a determination that: the first PDCCH candidate and the second PDCCH candidate start at a same location within the first control resource set; the first control resource set is a non-interleaved control resource set that has a single orthogonal frequency division multiplex (OFDM) symbol; the first PDCCH candidate and the second PDCCH candidate are in a first search space set that is linked to a second search space set for PDCCH repetition; a PUCCH resource set that includes the PUCCH resource includes more than eight PUCCH resources; and a first starting CCE of a third PDCCH candidate that is a duplicate of the first PDCCH candidate is different from a second starting CCE of a fourth PDCCH candidate that is a duplicate of the second PDCCH candidate.

Aspect 8: The method of any of aspects 1 through 7, wherein: the first aggregation level corresponds to eight CCEs; and the second aggregation level corresponds to sixteen CCEs.

Aspect 9: The method of any of aspects 1 through 8, wherein: the first PDCCH candidate comprises a PUCCH resource indicator; the first control resource set comprises a defined number of control channel elements; and the method further comprises identifying the PUCCH resource based at least in part on the first CCE index, the PUCCH resource indicator, and the defined number of control channel elements.

Aspect 10: The method of any of aspects 1 through 9, wherein: the first PDCCH candidate comprises first downlink control information (DCI) that schedules a first physical downlink shared channel (PDSCH) transmission; and the second PDCCH candidate comprises second DCI that schedules a second PDSCH transmission.

Aspect 11: A user equipment comprising: a transceiver configured to communicate with a radio access network, a memory, and a processor coupled to the transceiver and the memory, wherein the processor and the memory are configured to perform any one of aspects 1 through 10.

Aspect 12: An apparatus configured for wireless communication comprising at least one means for performing any one of aspects 1 through 10.

Aspect 13: A non-transitory computer-readable medium storing computer-executable code, comprising code for causing an apparatus to perform any one of aspects 1 through 10.

Aspect 21: A method for wireless communication at a user equipment, the method comprising: receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level; and transmitting the PUCCH with the acknowledgement information on a PUCCH resource identified based at least in part on a first CCE index that corresponds to a starting CCE of the fourth PDCCH candidate associated with the second aggregation level that is higher than the first aggregation level.

Aspect 22: The method of aspect 21, further comprising: identifying the PUCCH resource based at least in part on the first CCE index responsive to a determination that the first PDCCH candidate and the second PDCCH candidate start at a same location within the first control resource set.

Aspect 23: The method of any of aspects 21 through 22, further comprising: identifying the PUCCH resource based at least in part on the first CCE index responsive to a determination that the first control resource set is a non-interleaved control resource set that has a single orthogonal frequency division multiplexing (OFDM) symbol.

Aspect 24: The method of any of aspects 21 through 23, further comprising: identifying the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

Aspect 25: The method of any of aspects 21 through 24, further comprising: identifying the PUCCH resource based at least in part on the first CCE index responsive to a determination that a PUCCH resource set that includes the PUCCH resource includes more than eight PUCCH resources.

Aspect 26: The method of any of aspects 21 through 25, further comprising: identifying the PUCCH resource based at least in part on the first CCE index responsive to a determination that a starting CCE of the third PDCCH candidate is different from the starting CCE of the fourth PDCCH candidate.

Aspect 27: The method of aspect 22, further comprising identifying the PUCCH resource based at least in part on the first CCE index responsive to a determination that: the first PDCCH candidate and the second PDCCH candidate start at a same location within the first control resource set; the first control resource set is a non-interleaved control resource set that has a single orthogonal frequency division multiplex (OFDM) symbol; the first PDCCH candidate and the second PDCCH candidate are in a first search space set that is linked to a second search space set for PDCCH repetition, where the first search space set is assigned a first search space set index that is higher than a second search space set index assigned to the second search space set; a PUCCH resource set that includes the PUCCH resource includes more than eight PUCCH resources; and a starting CCE of the third PDCCH candidate is different from the starting CCE of the fourth PDCCH candidate.

Aspect 28: The method of any of aspects 21 through 27, wherein: the first aggregation level corresponds to eight CCEs; and the second aggregation level corresponds to sixteen CCEs.

Aspect 29: The method of any of aspects 21 through 28, wherein: the first PDCCH candidate comprises a PUCCH resource indicator; the second control resource set comprises a defined number of control channel elements; and the method further comprises identifying the PUCCH resource based at least in part on the first CCE index, the PUCCH resource indicator, and the defined number of control channel elements.

Aspect 30: The method of any of aspects 21 through 29, wherein: the first PDCCH candidate comprises first downlink control information (DCI) that schedules a first physical downlink shared channel (PDSCH) transmission; and the second PDCCH candidate comprises second DCI that schedules a second PDSCH transmission.

Aspect 31: A user equipment comprising: a transceiver configured to communicate with a radio access network, a memory, and a processor coupled to the transceiver and the memory, wherein the processor and the memory are configured to perform any one of aspects 21 through 30.

Aspect 32: An apparatus configured for wireless communication comprising at least one means for performing any one of aspects 21 through 30.

Aspect 33: A non-transitory computer-readable medium storing computer-executable code, comprising code for causing an apparatus to perform any one of aspects 21 through 30.

Aspect 41: A method for wireless communication at a user equipment, the method comprising: receiving a first physical downlink control channel (PDCCH) candidate of a first control resource set, the first PDCCH candidate scheduling a physical uplink control channel (PUCCH) with acknowledgement information (e.g., HARQ-Ack information) and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level that is higher than the first aggregation level; and transmitting the PUCCH with the acknowledgement information on a PUCCH resource identified based at least in part on a first CCE index that corresponds to a starting CCE of the third PDCCH candidate associated with the first aggregation level that is lower than the second aggregation level.

Aspect 42: The method of aspect 41, further comprising: identifying the PUCCH resource based at least in part on the first CCE index responsive to a determination that the first PDCCH candidate and the second PDCCH candidate start at a same location within the first control resource set.

Aspect 43: The method of any of aspects 41 through 42, further comprising: identifying the PUCCH resource based at least in part on the first CCE index responsive to a determination that the first control resource set is a non-interleaved control resource set that has a single orthogonal frequency division multiplexing (OFDM) symbol.

Aspect 44: The method of any of aspects 41 through 43, further comprising: identifying the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

Aspect 45: The method of any of aspects 41 through 44, further comprising: identifying the PUCCH resource based at least in part on the first CCE index responsive to a determination that a PUCCH resource set that includes the PUCCH resource includes more than eight PUCCH resources.

Aspect 46: The method of any of aspects 41 through 45, further comprising: identifying the PUCCH resource based at least in part on the first CCE index responsive to a determination that the starting CCE of the third PDCCH candidate is different from a starting CCE of the fourth PDCCH candidate.

Aspect 47: The method of aspect 41, further comprising identifying the PUCCH resource based at least in part on the first CCE index responsive to a determination that: the first PDCCH candidate and the second PDCCH candidate start at a same location within the first control resource set; the first control resource set is a non-interleaved control resource set that has a single orthogonal frequency division multiplex (OFDM) symbol; the first PDCCH candidate and the second PDCCH candidate are in a first search space set that is linked to a second search space set for PDCCH repetition, where the first search space set is assigned a first search space set index that is higher than a second search space set index assigned to the second search space set; a PUCCH resource set that includes the PUCCH resource includes more than eight PUCCH resources; and the starting CCE of the third PDCCH candidate is different from a starting CCE of the fourth PDCCH candidate.

Aspect 48: The method of any of aspects 41 through 47, wherein: the first aggregation level corresponds to eight CCEs; and the second aggregation level corresponds to sixteen CCEs.

Aspect 49: The method of any of aspects 41 through 48, wherein: the first PDCCH candidate comprises a PUCCH resource indicator; the second control resource set comprises a defined number of control channel elements; and the method further comprises identifying the PUCCH resource based at least in part on the first CCE index, the PUCCH resource indicator, and the defined number of control channel elements.

Aspect 50: The method of any of aspects 41 through 49, wherein: the first PDCCH candidate comprises first downlink control information (DCI) that schedules a first physical downlink shared channel (PDSCH) transmission; and the second PDCCH candidate comprises second DCI that schedules a second PDSCH transmission.

Aspect 51: A user equipment comprising: a transceiver configured to communicate with a radio access network, a memory, and a processor coupled to the transceiver and the memory, wherein the processor and the memory are configured to perform any one of aspects 41 through 50.

Aspect 52: An apparatus configured for wireless communication comprising at least one means for performing any one of aspects 41 through 50.

Aspect 53: A non-transitory computer-readable medium storing computer-executable code, comprising code for causing an apparatus to perform any one of aspects 41 through 50.

Aspect 61: A method for wireless communication at a user equipment, the method comprising: receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first starting CCE and the fourth PDCCH candidate being associated with a second starting CCE that is higher than the first starting CCE within the second control resource set; and transmitting the PUCCH with the acknowledgement information on a PUCCH resource identified based at least in part on a first CCE index that corresponds to the second starting CCE.

Aspect 62: The method of aspect 61, further comprising: identifying the PUCCH resource based at least in part on the first CCE index responsive to a determination that the first PDCCH candidate and the second PDCCH candidate start at a same location within the first control resource set.

Aspect 63: The method of any of aspects 61 through 62, further comprising: identifying the PUCCH resource based at least in part on the first CCE index responsive to a determination that the first control resource set is a non-interleaved control resource set that has a single orthogonal frequency division multiplexing (OFDM) symbol.

Aspect 64: The method of any of aspects 61 through 63, further comprising: identifying the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

Aspect 65: The method of any of aspects 61 through 64, further comprising: identifying the PUCCH resource based at least in part on the first CCE index responsive to a determination that a PUCCH resource set that includes the PUCCH resource includes more than eight PUCCH resources.

Aspect 66: The method of any of aspects 61 through 65, further comprising: identifying the PUCCH resource based at least in part on the first CCE index responsive to a determination that the first starting CCE is different from the second starting CCE.

Aspect 67: The method of aspect 61, further comprising identifying the PUCCH resource based at least in part on the first CCE index responsive to a determination that: the first PDCCH candidate and the second PDCCH candidate start at a same location within the first control resource set; the first control resource set is a non-interleaved control resource set that has a single orthogonal frequency division multiplex (OFDM) symbol; the first PDCCH candidate and the second PDCCH candidate are in a first search space set that is linked to a second search space set for PDCCH repetition, where the first search space set is assigned a first search space set index that is higher than a second search space set index assigned to the second search space set; a PUCCH resource set that includes the PUCCH resource includes more than eight PUCCH resources; and the first starting CCE is different from the second starting CCE.

Aspect 68: The method of any of aspects 61 through 67, wherein: the third PDCCH candidate is associated with a first aggregation level; and the fourth PDCCH candidate is associated with a second aggregation level that is different from the first aggregation level.

Aspect 69: The method of any of aspects 61 through 68, wherein: the first PDCCH candidate comprises a PUCCH resource indicator; the second control resource set comprises a defined number of control channel elements; and the method further comprises identifying the PUCCH resource based at least in part on the first CCE index, the PUCCH resource indicator, and the defined number of control channel elements.

Aspect 70: The method of any of aspects 61 through 69, wherein: the first PDCCH candidate comprises first downlink control information (DCI) that schedules a first physical downlink shared channel (PDSCH) transmission; and the second PDCCH candidate comprises second DCI that schedules a second PDSCH transmission.

Aspect 71: A user equipment comprising: a transceiver configured to communicate with a radio access network, a memory, and a processor coupled to the transceiver and the memory, wherein the processor and the memory are configured to perform any one of aspects 61 through 70.

Aspect 72: An apparatus configured for wireless communication comprising at least one means for performing any one of aspects 61 through 70.

Aspect 73: A non-transitory computer-readable medium storing computer-executable code, comprising code for causing an apparatus to perform any one of aspects 61 through 70.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 12, 13, and 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver;
one or more memories that store processor-executable code; and
one or more processors configured to execute the processor-executable code and cause the user equipment to:
receive, via the transceiver, a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level; and
transmit, via the transceiver, the PUCCH with the acknowledgement information on a PUCCH resource identified based at least in part on a first CCE index that corresponds to a starting CCE of the fourth PDCCH candidate responsive to a determination that the second aggregation level is higher than the first aggregation level.

2. The user equipment of claim 1, wherein the one or more processors are further configured to execute the processor-executable code and cause the user equipment to:
identify the PUCCH resource based at least in part on the first CCE index responsive to a determination that the first PDCCH candidate and the second PDCCH candidate start at a same location within the first control resource set.

3. The user equipment of claim 1, wherein the one or more processors are further configured to execute the processor-executable code and cause the user equipment to:
identify the PUCCH resource based at least in part on the first CCE index responsive to a determination that the first control resource set is a non-interleaved control resource set that has a single orthogonal frequency division multiplexing (OFDM) symbol.

4. The user equipment of claim 1, wherein the one or more processors are further configured to execute the processor-executable code and cause the user equipment to:
identify the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

5. The user equipment of claim 1, wherein the one or more processors are further configured to execute the processor-executable code and cause the user equipment to:
identify the PUCCH resource based at least in part on the first CCE index responsive to a determination that a PUCCH resource set that includes the PUCCH resource includes more than eight PUCCH resources.

6. The user equipment of claim 1, wherein the one or more processors are further configured to execute the processor-executable code and cause the user equipment to:
identify the PUCCH resource based at least in part on the first CCE index responsive to a determination that a starting CCE of the third PDCCH candidate is different from the starting CCE of the fourth PDCCH candidate.

7. The user equipment of claim 1, wherein the one or more processors are further configured to execute the processor-executable code and cause the user equipment to identify the PUCCH resource based at least in part on the first CCE index responsive to a determination that:
the first PDCCH candidate and the second PDCCH candidate start at a same location within the first control resource set;
the first control resource set is a non-interleaved control resource set that has a single orthogonal frequency division multiplex (OFDM) symbol;
the first PDCCH candidate and the second PDCCH candidate are in a first search space set that is linked to a second search space set for PDCCH repetition, where the first search space set is assigned a first search space set index that is higher than a second search space set index assigned to the second search space set;
a PUCCH resource set that includes the PUCCH resource includes more than eight PUCCH resources; and
a starting CCE of the third PDCCH candidate is different from the starting CCE of the fourth PDCCH candidate.

8. The user equipment of claim 1, wherein:
the first aggregation level corresponds to eight CCEs; and
the second aggregation level corresponds to sixteen CCEs.

9. The user equipment of claim 1, wherein:
the first PDCCH candidate comprises a PUCCH resource indicator;
the second control resource set comprises a defined number of control channel elements; and
the one or more processors are further configured to execute the processor-executable code and cause the user equipment to identify the PUCCH resource based at least in part on the first CCE index, the PUCCH resource indicator, and the defined number of control channel elements.

10. The user equipment of claim 1, wherein:
the first PDCCH candidate comprises first downlink control information (DCI) that schedules a first physical downlink shared channel (PDSCH) transmission; and
the second PDCCH candidate comprises second DCI that schedules a second PDSCH transmission.

11. A method for wireless communication at a user equipment, the method comprising:
receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level; and
transmitting the PUCCH with the acknowledgement information on a PUCCH resource identified based at least in part on a first CCE index that corresponds to a starting CCE of the fourth PDCCH candidate responsive to a determination that the second aggregation level is higher than the first aggregation level.

12. The method of claim 11, further comprising:
identifying the PUCCH resource based at least in part on the first CCE index responsive to a determination that the first PDCCH candidate and the second PDCCH candidate start at a same location within the first control resource set.

13. The method of claim 11, further comprising:
identifying the PUCCH resource based at least in part on the first CCE index responsive to a determination that the first control resource set is a non-interleaved control resource set that has a single orthogonal frequency division multiplexing (OFDM) symbol.

14. The method of claim 11, further comprising:
identifying the PUCCH resource based at least in part on the first CCE index responsive to a determination that the first PDCCH candidate and the second PDCCH candidate are in a first search space set that is linked to a second search space set for PDCCH repetition, where the first search space set is assigned a first search space set index that is higher than a second search space set index assigned to the second search space set.

15. The method of claim 11, further comprising:
identifying the PUCCH resource based at least in part on the first CCE index responsive to a determination that a PUCCH resource set that includes the PUCCH resource includes more than eight PUCCH resources.

16. The method of claim 11, further comprising:
identifying the PUCCH resource based at least in part on the first CCE index responsive to a determination that a starting CCE of the third PDCCH candidate is different from the starting CCE of the fourth PDCCH candidate.

17. The method of claim 11, further comprising identifying the PUCCH resource based at least in part on the first CCE index responsive to a determination that:
the first PDCCH candidate and the second PDCCH candidate start at a same location within the first control resource set;
the first control resource set is a non-interleaved control resource set that has a single orthogonal frequency division multiplex (OFDM) symbol;
the first PDCCH candidate and the second PDCCH candidate are in a first search space set that is linked to a second search space set for PDCCH repetition, where the first search space set is assigned a first search space set index that is higher than a second search space set index assigned to the second search space set;
a PUCCH resource set that includes the PUCCH resource includes more than eight PUCCH resources; and
a starting CCE of the third PDCCH candidate is different from the starting CCE of the fourth PDCCH candidate.

18. The method of claim 11, wherein:
the first aggregation level corresponds to eight CCEs; and
the second aggregation level corresponds to sixteen CCEs.

19. The method of claim 11, wherein:
the first PDCCH candidate comprises a PUCCH resource indicator;
the second control resource set comprises a defined number of control channel elements; and
the method further comprises identifying the PUCCH resource based at least in part on the first CCE index, the PUCCH resource indicator, and the defined number of control channel elements.

20. The method of claim 11, wherein:
the first PDCCH candidate comprises first downlink control information (DCI) that schedules a first physical downlink shared channel (PDSCH) transmission; and
the second PDCCH candidate comprises second DCI that schedules a second PDSCH transmission.

21. A user equipment, comprising:
means for receiving a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level; and means for transmitting the PUCCH with the acknowledgement information on a PUCCH resource identified based at least in part on a first CCE index that corresponds to a starting CCE of the fourth PDCCH candidate responsive to a determination that the second aggregation level is higher than the first aggregation level.

22. A non-transitory computer-readable medium having stored therein instructions executable by one or more processors of a user equipment to:

receive a first physical downlink control channel (PDCCH) candidate of a first control resource set, the first PDCCH candidate scheduling a physical uplink control channel (PUCCH) with acknowledgement information and starting at a same control channel element (CCE) within the first control resource set as a second PDCCH candidate, the first PDCCH candidate being repeated in a third PDCCH candidate of a second control resource set, the second PDCCH candidate being repeated in a fourth PDCCH candidate of the second control resource set, the third PDCCH candidate being associated with a first aggregation level and the fourth PDCCH candidate being associated with a second aggregation level; and transmit the PUCCH with the acknowledgement information on a PUCCH resource identified based at least in part on a first CCE index that corresponds to a starting CCE of the fourth PDCCH candidate responsive to a determination that the second aggregation level is higher than the first aggregation level.

* * * * *